(12) United States Patent
Yamagishi et al.

(10) Patent No.: US 6,639,813 B2
(45) Date of Patent: Oct. 28, 2003

(54) ZERO-VOLTAGE-SWITCHING POWER SUPPLY

(75) Inventors: Toshiyuki Yamagishi, Kounosu (JP); Koichi Morita, Fujimi (JP)

(73) Assignee: Sanken Electric Co, Ltd. (JP)

( * ) Notice: Subject to any disclaimer, the term of this patent is extended or adjusted under 35 U.S.C. 154(b) by 0 days.

(21) Appl. No.: 10/183,258

(22) Filed: Jun. 26, 2002

(65) Prior Publication Data

US 2003/0002301 A1 Jan. 2, 2003

(30) Foreign Application Priority Data

Jun. 29, 2001 (JP) ........................................ 2001-199719

(51) Int. Cl.[7] .............................................. H02M 3/335
(52) U.S. Cl. .................................. 363/21.12; 363/21.01
(58) Field of Search ................................ 363/20, 21.01, 363/21.04, 21.12

(56) References Cited

U.S. PATENT DOCUMENTS 6,061,253 A * 5/2000 Igarashi et al. ................ 363/21
6,282,103 B1 * 8/2001 Naito et al. ............... 363/21.12
6,396,719 B2 * 5/2002 Morita et al. ............ 363/21.12
6,466,463 B1 * 10/2002 Morita ..................... 363/21.16

FOREIGN PATENT DOCUMENTS

JP          08154379 A      6/1996

* cited by examiner

*Primary Examiner*—Jeffrey Sterrett
(74) *Attorney, Agent, or Firm*—Woodcock Washburn LLP

(57) ABSTRACT

A power supply including a transformer having a primary winding connected to a pair of a.c. input terminals via a rectifier circuit, and a secondary winding connected to a pair of d.c. output terminals via a rectifying and smoothing circuit. Connected between the pair of outputs of the rectifier circuit via the transformer primary, a primary switch is turned on and off to keep the d.c. output voltage constant. Electromagnetically coupled together, two inductance coils are connected to the rectifier circuit for improvements in power factor and input waveform. An ancillary switch is connected in parallel with the serial connection of the transformer primary and the primary switch in order to provide a discharge circuit for a soft-switching capacitor connected in parallel with the primary switch. Switching loss is reduced by causing the soft-switching capacitor to discharge before the primary switch is turned on.

10 Claims, 9 Drawing Sheets

ZERO-VOLTAGE-SWITCHING POWER SUPPLY

BACKGROUND OF THE INVENTION

This invention relates to electric power supplies, and particularly to a switching power supply capable of a.c. to d.c. voltage conversion, featuring provisions for attainment of closer approximation of the input current waveform to a sinusoidal wave, and a higher power factor, than by the comparable prior art.

A conversion from an alternating to a direct current is possible by a rectifying and smoothing circuit comprising a rectifying circuit having a diode connected to an a.c. power supply, and a smoothing capacitor connected to the rectifying circuit. This type of rectifying and smoothing circuit possesses the disadvantage, however, of a somewhat poor power factor as a result of the fact that the smoothing capacitor is charged only at or adjacent the peaks of the a.c. voltage of sinusoidal waveform. Another drawback is that it is incapable of adjustably varying the d.c. output voltage.

Japanese Unexamined Patent Publication No. 8-154379 represents an improvement of the rectifying and smoothing circuit above. It teaches a switching power supply comprising a rectifying circuit, a smoothing capacitor, a d.c.-to-d.c. converter circuit, and an inductive reactor for a higher power factor. The reactor is electrically connected between the pair of output terminals of the rectifying circuit upon closure of a switch included in the d.c.-to-d.c. converter circuit. The desired improvements in power factor and in input current waveform are thus attained, as the current flowing through the reactor varies in amplitude in step with the a.c. input voltage.

This prior art switching power supply has proved to be not wholly satisfactory, however, particularly in terms of power loss. The advent of a more efficient power supply has been awaited.

SUMMARY OF THE INVENTION

The present invention seeks to reduce the power loss, and hence improve the efficiency, of the switching power supply of the kind discussed above, without impairment of its inherent advantages.

Briefly, the invention may be summarized as a switching power supply capable of translating a.c. voltage into d.c. voltage. Included are a rectifier circuit connected to a pair of a.c. input terminals for rectifying a.c. input voltage, a transformer having a primary winding, and a rectifying and smoothing circuit connected between the transformer and a pair of d.c. output terminals for providing d.c. output voltage. The rectifier circuit has at least two output conductors. A smoothing capacitor is connected between one of these output conductors of the rectifier circuit and a first extremity of the primary winding of the transformer. A primary switch is connected between a second extremity of the primary winding and said one output conductor of the rectifier circuit. Also included are a first ancillary winding (e.g. tertiary winding of the transformer) electromagnetically coupled to the primary winding and having a first extremity connected to the first extremity of the primary winding and the smoothing capacitor, a second ancillary winding (e.g. quaternary winding) electromagnetically coupled to the primary winding and to the first ancillary winding and having a first extremity connected to a second extremity of the first ancillary winding, a first inductance coil connected between the other output conductor of the rectifier circuit and a second extremity of the first ancillary winding, and a second inductance coil connected between said other output conductor of the rectifier circuit and the smoothing capacitor and electromagnetically coupled to the first inductance coil. Additionally, and perhaps most characteristically of the invention, there is provided an ancillary switch which is connected in parallel with a serial connection of the transformer primary and the primary switch via the first and the second ancillary winding. A switch control circuit is connected to the primary switch and the ancillary switch for on-off control thereof at a repetition frequency higher than the frequency of the a.c. input voltage. The switch control circuit is adapted to turn the ancillary switch on earlier than the primary switch is turned on, and to turn the ancillary switch off not later than the primary switch is turned off.

Current flows through the first and the second inductance coils as the primary switch is turned on and off at a prescribed switching frequency. The current varies in amplitude in proportion with that of the a.c. input voltage, realizing a higher power factor and a better waveform as in the noted prior art.

Each time the ancillary switch is turned on earlier than is the primary switch, current flows through the first and the second ancillary winding connected in series with the ancillary switch. Since these ancillary windings are in fact the tertiary and quaternary of the transformer, the current flow through these windings results in a discharge of soft-switching capacitance means conventionally connected in parallel with the primary switch, and hence in a drop in the voltage across the primary switch. Thus the primary switch is to be turned on at zero voltage; that is, the so-called "soft switching" is accomplished. The advantages accruing from such soft switching include less switching loss and less noise production.

The primary switch is utilized both for improvements in power factor and waveform and for d.c.-to-d.c. conversion. All these objectives are therefore realized in a device of simple, inexpensive and compact design.

It will also be appreciated that the two ancillary windings for the soft switching of the primary switch can be incorporated with the transformer. The ancillary windings are therefore not to add substantially to the size of the power supply.

According to a further feature of the invention, the ancillary switch has an ancillary diode connected in series therewith for blocking reverse current flow. The diodes constituting the rectifier circuit are thus blocked from high frequency current due to the switching of the primary switch and so prevented from noise production.

A still further feature of the invention resides in a bypass capacitor which is less in capacitance than the smoothing capacitor and which is connected between the two outputs of the rectifier circuit. Such a bypass capacitor will expedite the release of the energy that has been stored on the second ancillary winding, or transformer quaternary.

The two inductance coils are connected in parallel with each other in some preferred embodiments of the invention, and in series with each other in others. Experiment has proved that the power factor is satisfactory either way.

The above and other objects, features and advantages of this invention will become more apparent, and the invention itself will best be understood, from a study of the following description and appended claims, with reference had to the attached drawings showing the preferred embodiments of the invention.

DESCRIPTION OF THE PREFERRED EMBODIMENTS

Figure 1:
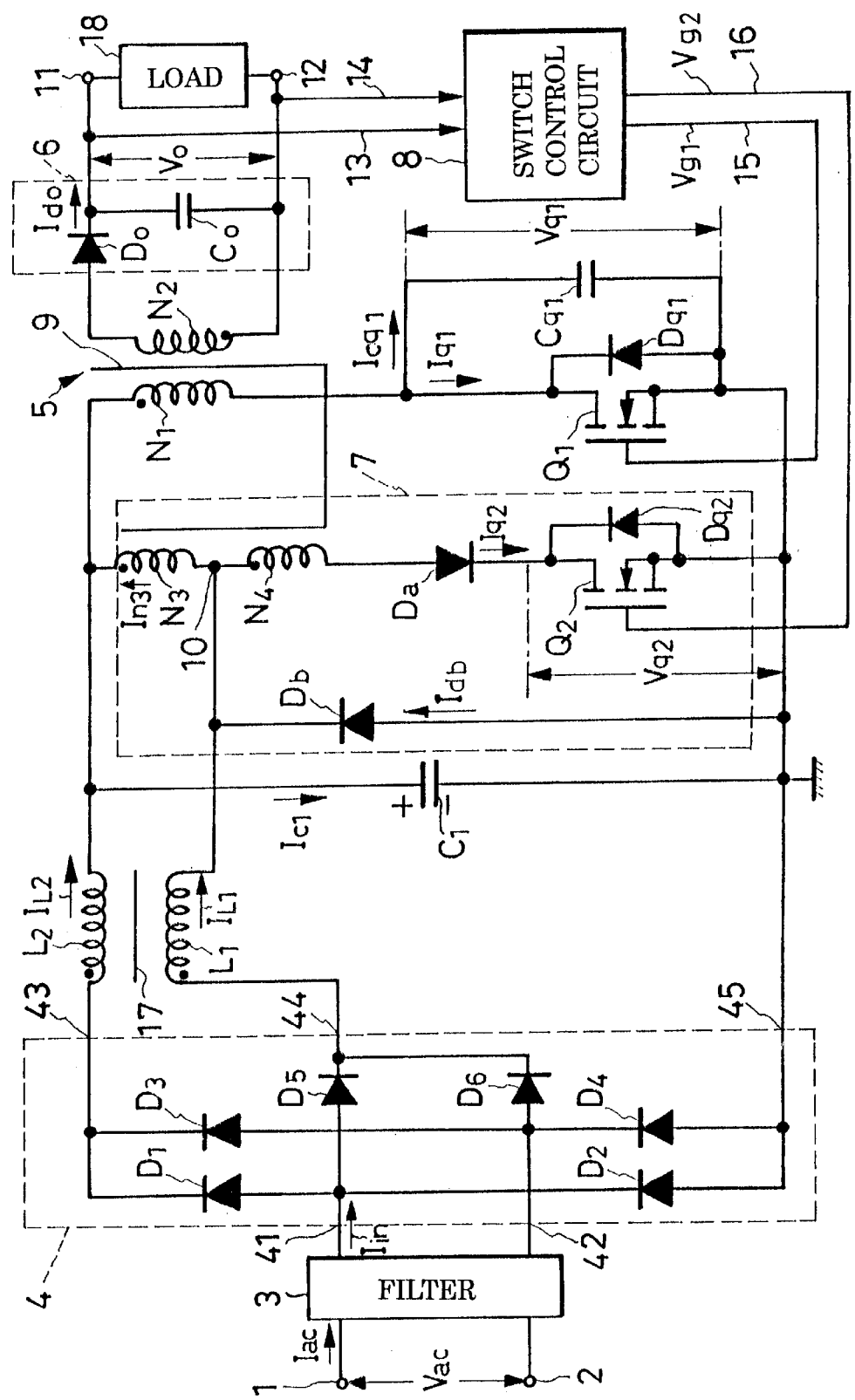
FIG. 1 is a schematic electrical diagram of a first preferred form of switching power supply according to the invention.

The switching power supply shown in FIG. 1 by way of a preferable embodiment of the invention has a pair of input terminals 1 and 2 which are to be connected to a source, not shown, of commercial alternating current with a frequency of 50 Hz or any other local value. Connected directly to this pair of input terminals 1 and 2 is a noise filter 3 of conventional make comprising inductors and capacitors for removal of the high-frequency noise component from the incoming fixed-frequency alternating current.

The noise filter 3 is connected on the other hand to a rectifier circuit 4 by way of a pair of output conductors 41 and 42. The rectifier circuit 4 has six diodes $D_1$, $D_2$, $D_3$, $D_4$, $D_5$ and $D_6$ in combination with three output conductors 43, 44 and 45. The first diode $D_1$ has its anode connected to the first a.c. input conductor 41, and its cathode to the first rectifier output conductor 43, the second diode $D_2$ has its cathode connected to the first a.c. input conductor 41, and its anode to the third rectifier output conductor 45. The third diode $D_3$ has its anode connected to the second a.c. input conductor 42, and its cathode to the first rectifier output conductor 43. The fourth diode $D_4$ has its cathode connected to the second a.c. input conductor 42, and its anode to the third rectifier output conductor 45. The fifth diode $D_5$ has its anode connected to the first a.c. input conductor 41, and its cathode to the second rectifier output conductor 44. The sixth diode $D_6$ has its anode connected to the second a.c. input conductor 42, and its cathode to the second rectifier output conductor 44.

It will be observed that the third output conductor 45 of the rectifier 4 is grounded. This rectifier output conductor 45 may therefore be sometimes referred to simply as the grounded conductor hereinafter in this specification.

At 5 in FIG. 1 is shown a transformer having a primary winding $N_1$, a secondary winding $N_2$, a tertiary winding $N_3$ and a quaternary winding $N_4$, all wound around a magnetic core 9 and electromagnetically coupled together. The transformer primary $N_1$ and secondary $N_2$ are opposite, but the transformer primary $N_1$ and tertiary $N_3$ and quaternary $N_4$ are the same, in polarity, as indicated by the dots in FIG. 1. The transformer primary $N_1$ and tertiary $N_3$ have their extremities of the same polarity connected to the first rectifier output conductor 43 via an inductance coil $L_2$. The junction 10 between the transformer tertiary $N_3$ and quaternary $N_4$ is connected to the second rectifier output conductor 44 via another inductance coil $L_1$. It is also understood that the transformer tertiary $N_3$ is less in turns than the transformer primary $N_1$, and that the transformer quaternary $N_4$ is not more in turns than the transformer tertiary $N_3$.

A smoothing capacitor $C_1$, preferably an electrolytic capacitor, has one of its opposite polarity terminals connected to the first rectifier output conductor 43 via the inductance coil $L_2$. The other terminal of the smoothing capacitor $C_1$ is connected to the grounded third rectifier output conductor 45. It will also be seen that the smoothing capacitor $C_1$ is parallel to the serial connection of the transformer primary $N_1$ and a primary switch $Q_1$.

Shown as an insulated-gate field-effect transistor, the primary switch $Q_1$ is connected between the second 44 and third 45 rectifier output conductors via the transformer primary $N_1$, transformer tertiary $N_3$ and first inductance coil $L_1$, besides being connected in parallel with the smoothing capacitor $C_1$ via the transformer primary $N_1$. A diode $D_{q1}$ is connected reversely in parallel with the primary switch $Q_1$ for its protection. This switch protection diode $D_{q1}$, however, could be replaced by the so-called body diode of the primary switch $Q_1$, or a diode built into it.

A capacitor $C_{q1}$ for the soft switching of the primary switch $Q_1$ is connected in parallel therewith. This soft-switching capacitor $C_{q1}$ should be less in capacitance than the smoothing capacitor $C_1$. The parasitic capacitance between the two electrodes, drain and source in this case, of the primary switch $Q_1$ could serve the purposes of the soft-switching capacitor $C_{q1}$, though.

The transformer secondary $N_2$ has its pair of opposite extremities connected respectively to the pair of output terminals 11 and 12 of this switching power supply via a rectifying and smoothing circuit 6. The rectifying and smoothing circuit 6 comprises a rectifying diode $D_0$ and a smoothing capacitor $C_0$. Connected between one extremity of the transformer secondary $N_2$ and the output terminal 11, the rectifying diode $D_0$ is so oriented as to be conductive when the primary switch $Q_1$ is off, and nonconductive when the primary switch $Q_1$ is on. The smoothing capacitor $C_0$ is connected in parallel with the transformer secondary $N_2$ via the rectifying diode $D_0$. A unidirectional output voltage is thus obtained between the pair of output terminals 11 and 12 for feeding a load 18 connected thereto.

The reference numeral 7 in FIG. 1 generally denotes an ancillary soft-switching circuit or an ancillary resonance circuit comprising an ancillary switch $Q_2$ shown as another FET, two ancillary diodes $D_a$ and $D_b$, and a second switch protection diode $D_{q2}$, in addition to the aforesaid transformer tertiary $N_3$ and quaternary $N_4$, which are inductive. Shown connected in parallel with the ancillary switch $Q_2$ for its protection, the diode $D_{q2}$ is not an essential component of the ancillary soft-switching circuit 7, as the so-called body diode of the FET switch $Q_2$ could serve its purposes.

The transformer tertiary $N_3$ and quaternary $N_4$ have their polarities so determined as to enable the transformer primary $N_1$ to develop a voltage to cause the soft-switching capacitor $C_{q1}$ to discharge, in response to the current supplied to the transformer tertiary $N_3$ and quaternary $N_4$ from the smoothing capacitor $C_1$. There may be cases in which these inductive transformer windings $N_3$ and $N_4$ fail to provide all the inductances needed; in such cases, an additional inductor may be connected in series with the quaternary $N_4$.

It will be seen that the ancillary soft-switching circuit 7 includes a serial connection of the transformer tertiary $N_3$, quaternary $N_4$, first ancillary diode $D_a$, and ancillary switch $Q_2$. This serial connection is in parallel with the serial connection of the transformer primary $N_1$ and primary switch $Q_1$, and with the smoothing capacitor $C_1$ as well. More specifically, the transformer tertiary $N_3$ has one of its extremities connected to one extremity of the transformer primary $N_1$, and the other extremity connected to the source of the primary switch $Q_1$ via the transformer quaternary $N_4$, first ancillary diode $D_a$ and ancillary switch $Q_2$. It is understood that the ancillary switch $Q_2$ has parasitic capacitance between its drain and source. The first ancillary diode $D_a$ is so oriented as to be forward biased by the voltage across the smoothing capacitor $C_1$. The second ancillary diode $D_b$ is connected in parallel with the serial connection of the transformer quaternary $N_4$, first ancillary diode $D_a$ and ancillary switch $Q_2$. The second ancillary diode $D_b$ and second switch protection diode $D_{q2}$ are both so oriented as to be reverse biased by the voltage across the smoothing capacitor $C_1$.

The two inductance coils or inductors $L_1$ and $L_2$ are both intended for a higher power factor and waveform improvement. Wound upon a common magnetic core 17, the coils $L_1$ and $L_2$ are electromagnetically coupled together and polarized in the same direction. The first coil $L_1$ has one extremely connected to the second rectifier output conductor 44, and the other extremity connected to the junction 10 between the transformer tertiary $N_3$ and quaternary $N_4$. The second coil $L_2$ has one extremely connected to the first rectifier output conductor 43, and the other extremity connected to the smoothing capacitor $C_1$.

As shown also in FIG. 1, a switch control circuit 8 has inputs connected to the pair of power supply output terminals 11 and 12 by way of conductors 13 and 14, respectively, an output connected to the control terminal of the primary switch $Q_1$ by way of a conductor 15, and another output connected to the control terminal of the ancillary switch $Q_2$ by way of a conductor 16. The indicia $V_{g1}$ and $V_{g2}$ on the output conductors 15 and 16 stand for the switch control signals applied to the switches $Q_1$ and $Q_2$, respectively, from the switch control circuit 8. Actually, the switch control circuit 8 is electrically connected to the sources of the FET switches $Q_1$ and $Q_2$, but such connections are not shown as they are considered apparent to the specialists.

Figure 2:
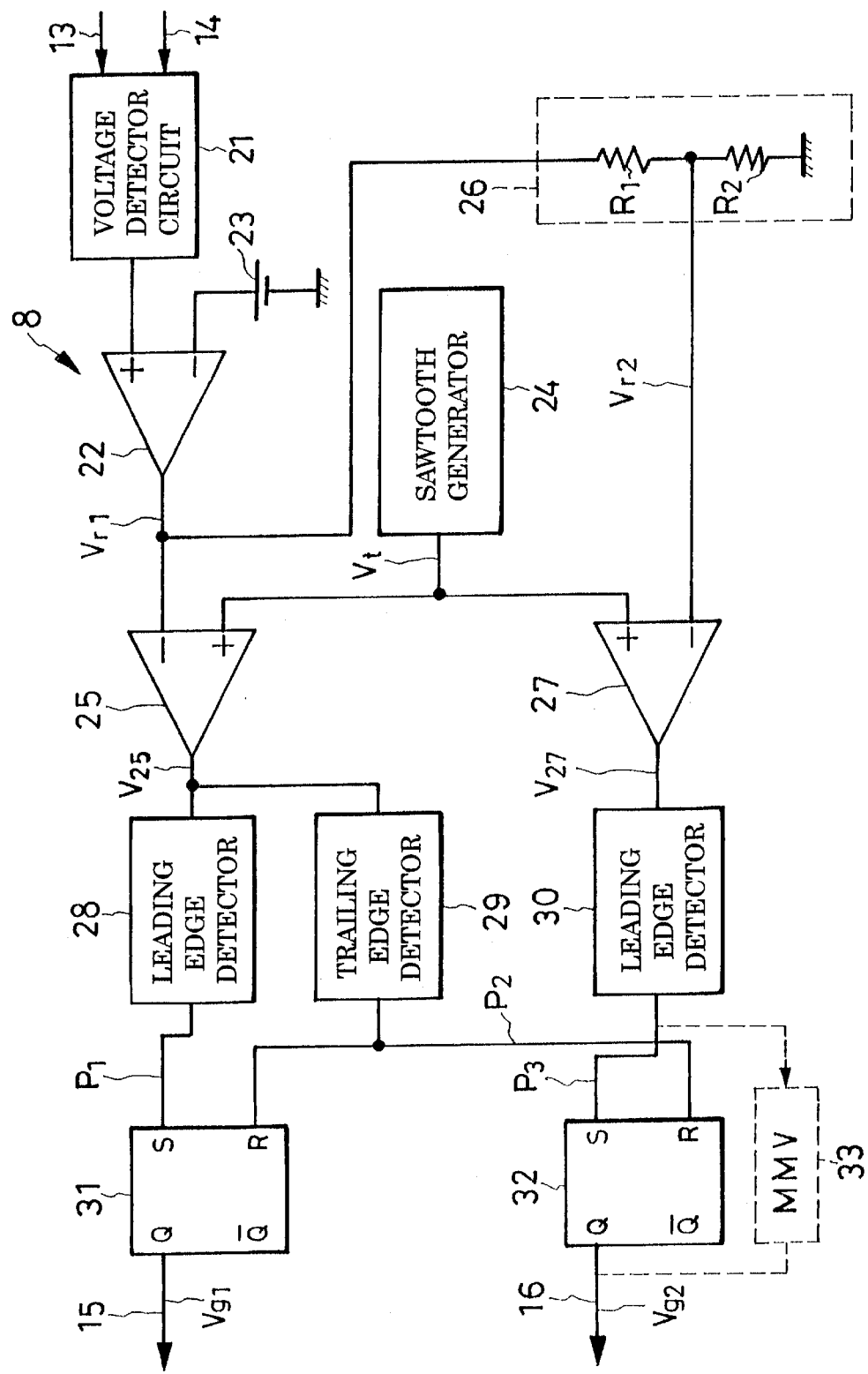
FIG. 2 is a schematic electrical diagram, partly in block form, showing in more detail the switch control circuit included in the FIG. 1 switching power supply.

FIG. 2 is a more detailed illustration of the switch control circuit 8. Included is a voltage detector circuit 21 which is connected to the pair of power supply output terminals 11 and 12, FIG. 1, via the input conductors 13 and 14 for providing an output voltage proportional to the power supply output voltage $V_o$. The output of the voltage detector circuit 21 is connected to one input of a differential amplifier 22, the other input of which is connected to a reference voltage source 23. Comparing the voltage detector output voltage and the reference voltage, the differential amplifier 22 delivers the difference $V_{r1}$ therebetween both to one input of a first comparator 25 and, via a level setting circuit 26, to one input of a second comparator 27. A sawtooth generator circuit 18 is connected to the other inputs of both comparators 25 and 27. Notwithstanding the showing of FIG. 2, however, the differential amplifier 22 could be photoelectrically coupled to both comparator 25 and level setting circuit 26, and so could the voltage detector circuit 21 to the differential amplifier 22.

Figure 3:
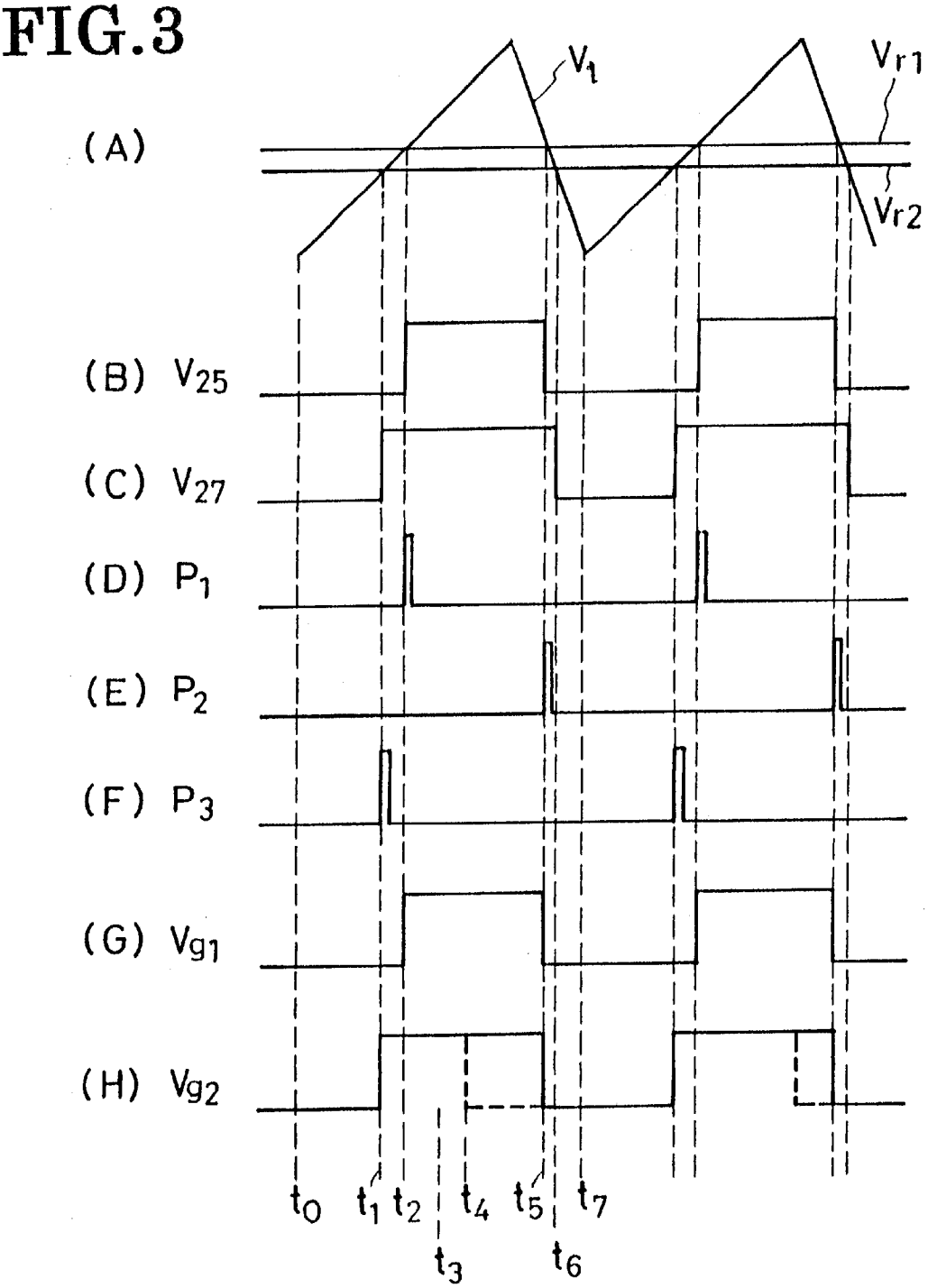
FIG. 3, consisting of (A) through (H), is a series of diagrams showing the waveforms appearing at various parts of the FIG. 2 switch control circuit in order to explain how the switch control signals for the primary and the ancillary switch of the FIG. 1 device are created according to the invention.

As indicated at (A) in FIG. 3, the sawtooth generator 24 generates a sawtooth voltage $V_t$ at a frequency higher than that of the incoming a.c. voltage $V_{ac}$ between the a.c. input terminals 1 and 2, FIG. 1. Comparing this sawtooth voltage $V_t$ and the output voltage $V_{r1}$, shown at (A) in FIG. 3, of the differential amplifier 22, the first comparator 25 puts out a rectangular pulse train $V_{25}$ as at (B) in FIG. 3.

The level setting circuit 26 has two voltage-dividing resistors $R_1$ and $R_2$ for putting out a voltage $V_{r2}$ which is less than the output voltage $V_{r1}$ of the differential amplifier 22, as indicated also at (A) in FIG. 3. Comparing the sawtooth voltage $V_t$ and the level setting circuit output voltage $V_{r2}$, the second comparator 27 produces an output $V_{27}$, (C) in FIG. 3, in the form of a train of pulses of greater duration than that of the output pulses $V_{25}$ of the first comparator 25.

The FIG. 2 switch control circuit 8 further comprises a pulse leading edge detector circuit 28 and a pulse trailing edge detector circuit 29, which are both connected to the output of the first comparator 25, and another pulse leading edge detector circuit 30 connected to the output of the second comparator 27. The pulse leading edge detector circuit 28 puts out a short duration pulse $P_1$, as at (D) in FIG. 3, in response to the leading edge of each output pulse $V_{25}$, at (B) in FIG. 3, of the first comparator 25. The pulse trailing edge detector circuit 29 puts out a short duration pulse $P_2$, as at (E) in FIG. 3, in response to the trailing edge of each output pulse $V_{25}$ of the first comparator 25. The other pulse leading edge detector circuit 30 puts out a similarly short duration pulse $P_3$, as at (F) in FIG. 3, in response to the leading edge of each output pulse $V_{27}$, at (C) in FIG. 3, of the second comparator 27. It will be noted from FIG. 5 that the first pulse leading edge detector circuit 28 produces a pulse $P_1$ as at $t_2$ whereas the second pulse leading edge detector circuit 30 produces a pulse $P_3$ as at $t_1$, a moment shortly before $t_2$.

The first pulse leading edge detector circuit 28 has its output connected to the set input S of a first RS flip flop 31. The pulse trailing edge detector circuit 29 has its output connected both to the reset input R of the first flip flop 31 and to the reset input R of a second RS flip flop 32. The second pulse leading edge detector circuit 30 has its output connected to the set input S of the first flip flop 31. The first flip flop 31 has its noninverting output Q connected to the primary switch $Q_1$, FIG. 1, by way of the switch control circuit output conductor 15. The second flip flop 32 has its noninverting output Q connected to the ancillary switch $Q_2$ by way of the other switch control circuit output conductor 16.

Thus the first flip flop 31 is to be set when triggered by each output pulse $P_1$ of the first pulse leading edge detector circuit 28, and reset when triggered by each output pulse $P_2$ of the pulse trailing edge detector circuit 29. At (G) in FIG. 3 are shown the resulting primary switch control pulses $V_{g1}$ produced by the first flip flop 31, for application to the gate of the primary switch $Q_1$ by the first flip flop 31. Each such pulse $V_{g1}$ lasts as from $t_2$ to $t_5$. The second flip flop 32 is to be set when triggered by each output pulse $P_3$ of the second pulse leading edge detector circuit 30, and reset when triggered by each output pulse $P_2$ of the pulse training edge detector circuit 29. FIG. 3 indicates at (H) the resulting ancillary switch control pulses $V_{g2}$ delivered from the second flip flop 32 to the gate of the ancillary switch $Q_2$. Each ancillary switch control pulse $V_{g2}$ lasts as from $t_1$ to $t_5$.

Figure 4:
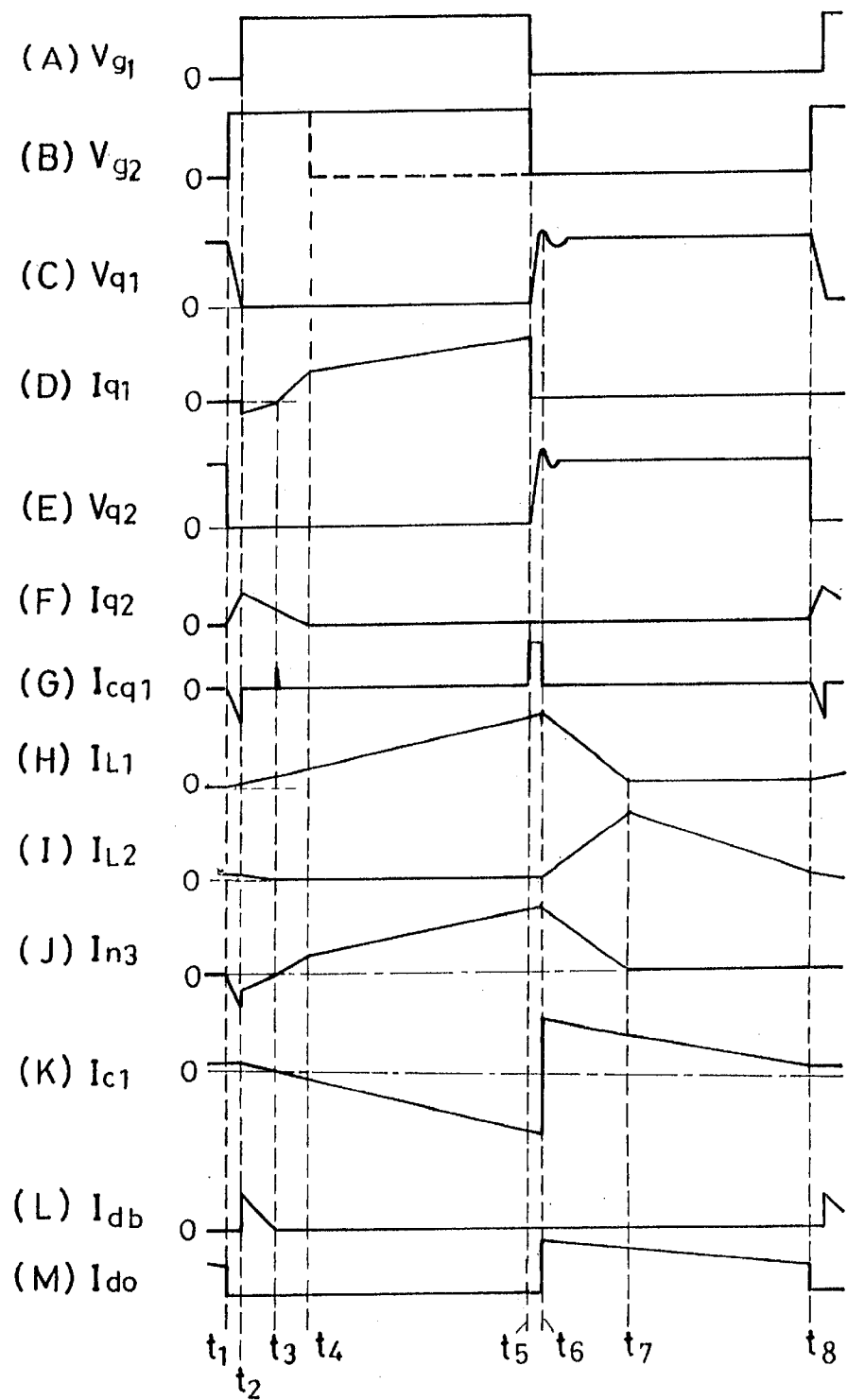
FIG. 4, consisting of (A) through (M), is a series of diagrams showing the voltage and current waveforms appearing at various parts of the FIG. 1 device in order to explain how the primary switch is soft-switched according to the invention.

A consideration of FIG. 4 will make it easier to understand hoist the two switches $Q_1$ and $Q_2$ are driven by the respective switch control signals $V_{g1}$ and $V_{g2}$. One primary switch control pulse $V_{g1}$ is shown at (A), and one ancillary switch control pulse $V_{g2}$ at (B), in FIG. 4. The primary switch $Q_1$ is off at $t_1$ when the ancillary switch control pulse $V_{g2}$ goes high to turn the ancillary switch $Q_2$ on. The primary switch control pulse $V_{g1}$ goes high at $t_2$, shortly after $t_1$, causing conduction through the primary switch $Q_1$. The time spacing between $t_1$ and $t_2$ must be well calculated to reduce switching loss to a minimum when the primary switch $Q_1$ is turned on.

Both primary and ancillary switches $Q_1$ and $Q_2$ are shown to go off at the same moment $t_5$ in FIGS. 3 and 4 in this particular embodiment of the invention. In practice, however, the ancillary switch $Q_2$ may be turned off at any moment from $t_4$ in FIG. 4, when the current $I_{q2}$ through the ancillary switch $Q_2$ becomes zero as at (F) in FIG. 4, and $t_5$ when the primary switch $Q_1$ goes off. The ancillary switch $Q_2$ should therefore be turned off at $t_5$ at the latest. In order to turn off the ancillary switch $Q_2$ at $t_4$, for instance, as indicated by the broken lines at (B) in FIG. 4, a monostable multivibrator may be employed in lieu of the second flip flop 32, FIG. 2, of the switch control circuit 8, as indicated by the broken lines in the same figure and designated 33. The MMV 33 may be made to produce pulses each lasting as from $t_1$ to $t_4$ in FIG. 4, in response to the output pulses $P_3$, at (F) in FIG. 3, of the second pulse leading edge detector circuit 30. Such MMV output pulses may be impressed directly to the ancillary switch $Q_2$ over the conductor 16.

Operation

In use of the FIG. 1 power supply the pair of a.c. input terminals 1 and 2 are to be connected to an unshown source of a.c. power, and the pair of d.c. output terminals 11 and 12 to the load 18. The smoothing capacitor $C_1$ will be charged to the desired d.c. voltage $V_{c1}$ as the primary switch $Q_1$ is turned on and off by the switch control circuit 8. The resulting steady-state operation of this representative switching power supply will be discussed hereinbelow with reference to FIGS. 4 and 5 which show the voltage and current waveforms appearing in various parts of the FIGS. 1 and 2 circuitry.

Figure 5:
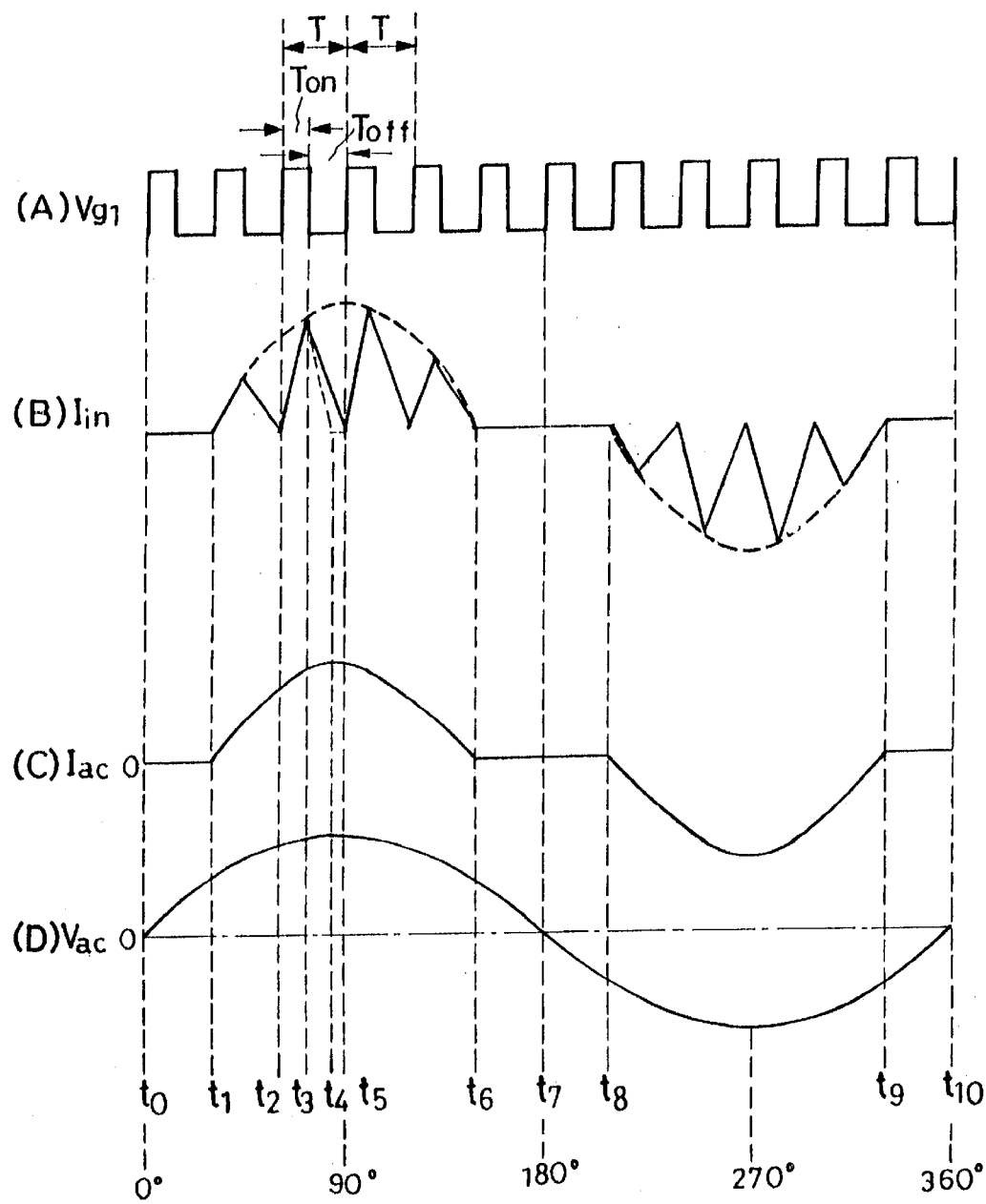
FIG. 5, consisting of (A) through (D), is a series of diagrams showing the voltage and current waveforms appearing at various parts of the FIG. 1 device in order to explain how improvements in power factor and waveform are attained.

FIG. 5 in particular is explanatory of how the instant invention attains improvements in power factor and input waveform. At (A) in this figure is shown the series of primary switch control pulses $V_{g1}$ applied from the switch control circuit 8 to the primary switch $Q_1$ for its on-off control. The primary switch $Q_1$ is turned on and off during each cycle T of the switch control signal, the cycle T consisting of one pulse, as from $t_2$ to $t_3$, and one space between such pulses, as from $t_3$ to $t_5$. The repetition rate of these primary switch control pulses $V_{g1}$ is now assumed to be 20 kHz. It is also understood that the 50 Hz a.c. voltage $V_{ac}$ is now applied between the pair of a.c. input terminals 1 and 2 as at (D) in FIG. 5.

As the primary switch $Q_1$ is repeatedly turned on and off as above, and the ancillary switch $Q_2$ concurrently turned on and off as at (B) in FIG. 4, the input current $I_{in}$ of the rectifier circuit 4 will change in amplitude as at (B) in FIG. 5 in step with the amplitude of the a.c. input voltage $V_{ac}$ at (D) in FIG. 5. Thus the a.c. input current $I_{ac}$ shown at (C) in FIG. 5 will closely approximate a sinusoidal wave, thereby achieving improvements in input waveform and in power factor. Incidentally, as a result of the connection of the first inductance coil $L_1$ to the junction 10 between the transformer tertiary $N_3$ and quaternary $N_4$, the current $I_{L1}$ does not flow through the first inductance coil $L_1$ unless the potential at the second rectifier output conductor 44 grows higher than that at the junction 10 due to the voltage $V_{C1}$ across the smoothing capacitor $C_1$. FIG. 5 shows the rectifier input current $I_{in}$ and a.c. input current $I_{ac}$ as flowing from $t_1$ to $t_6$ and from $t_8$ to $t_9$.

The operation of the FIG. 1 power supply exclusive of the ancillary soft-switching circuit 7 will be explained in some more detail. A current will flow through the path comprising the second rectifier output conductor 44, first inductance coil $L_1$, transformer tertiary $N_3$, transformer primary $N_1$, and primary switch $Q_1$ during the conducting periods $T_{on}$ of the primary switch $Q_1$, as from $t_2$ to $t_3$ in FIG. 5. A current will flow at the same time through the path comprising the smoothing capacitor $C_1$, transformer primary $N_1$, and primary switch $Q_1$. The voltage developing across the transformer secondary $N_2$ during these primary switch conducting periods $T_{on}$ is oriented to reverse bias the diode $D_0$, holding the same nonconductive. Energy is therefore stored on the transformer 5 during the primary switch conducting periods $T_{on}$, as well as on the first inductance coil $L_1$.

On the other hand, during the nonconducting periods $T_{off}$ of the primary switch $Q_1$, as from $t_3$ to $t_5$ in FIG. 5, both first inductance coil $L_1$ and transformer 5 will release the energy they have stored during each primary switch conducting period $T_{on}$, causing current flow through the path comprising the second rectifier output conductor 44, first inductance coil $L_1$, transformer tertiary $N_3$, and smoothing capacitor $C_1$. This capacitor $C_1$ will therefore be charged. A charging current for the smoothing capacitor $C_1$ will also flow through the path comprising the first rectifier output conductor 43, second inductance coil $L_2$, and smoothing capacitor $C_1$.

The current charging the smoothing capacitor $C_1$ during each primary switch nonconducting period $T_{off}$ will diminish with time. Unlike the showing of FIG. 3 the charging current of the smoothing capacitor $C_1$ need not flow throughout each primary switch nonconducting period $T_{off}$. The inductance values of the coils $L_1$ and $L_2$ may be so determined that the current $I_{in}$ may drop to zero as at $t_4$ in FIG. 5 during each primary switch nonconducting period $T_{off}$.

During these nonconducting periods $T_{off}$, due to energy release from the transformer 5, there will be induced across the transformer secondary $N_2$ a voltage oriented to cause conduction-through the diode $D_0$ of the rectifying and smoothing circuit 6. The capacitor $C_0$ and load 18 will both be powered through the diode $D_0$.

One cycle of switching operation, lasting as from $t_2$ to $t_5$ in FIG. 5, has now come to an end. The same cycle will be repeated after $t_5$ when the primary switch $Q_1$ is closed again. The power supply output voltage $V_0$ may exceed a predefined limit in the course of such repetition of switching cycles. Thereupon the switch control circuit 8 will respond by shortening the primary switch conducting periods $T_{on}$ to an extent necessary to return the power supply output voltage $V_0$ to normal. The switch control circuit 8 will also respond to an excessive drop in the power supply output voltage $V_0$, by making the primary switch conducting periods $T_{on}$ longer until the output voltage returns to normal.

Reference is now invited to FIG. 4 again for a study of how the ancillary soft switching circuit 7 functions for the soft switching of the primary switch $Q_1$. FIG. 4 may be considered an enlargement of a part of the $t_1$–$t_6$ period of FIG. 5. As will be noted from (A) and (B) in FIG. 4, which show the primary switch control pulses $V_{g1}$ and ancillary switch control pulses $V_{g2}$, both primary switch $Q_1$ and ancillary switch $Q_2$ are off. before $t_1$ in FIG. 4. Therefore, as in the $t_3$–$t_5$ period in FIG. 5, the diode current $I_{do}$ will flow as at (M) in FIG. 4, and the voltage $V_{q1}$ across the primary switch $Q_1$ and the voltage $V_{q2}$ across the ancillary switch $Q_2$ will be both held high before $t_1$ as at (C) and (E) in FIG. 4.

The ancillary switch $Q_2$ is shown turned on at $t_1$ by the ancillary switch control signal $V_{q2}$, at (B) in. FIG. 4. The current $I_{cq1}$ discharged by the soft switching capacitor $C_{q1}$ will then flow as at (G) in FIG. 4. There are two different paths for the flow of the discharge current, one comprising the soft switching capacitor $C_{q1}$, transformer primary $N_1$, transformer tertiary $N_3$, transformer quaternary $N_4$, ancillary diode $D_a$, and ancillary switch $Q_2$, and the other comprising the soft switching capacitor $C_{q1}$, transformer primary $N_1$, and smoothing capacitor $C_1$. The voltage $V_{q1}$ across the primary switch $Q_1$ will drop as at (C) in FIG. 4 with the flow of the discharge current, dropping substantially to zero at $t_2$. The transformer tertiary $N_3$ and quaternary $N_4$, both connected in series with the ancillary switch $Q_2$, are inductive, so that the discharge current $I_{cq1}$ of the soft switching capacitor $C_{q1}$ flows due to the resonance of the capacitance of the capacitor $C_{q1}$ and the inductances of the transformer tertiary $N_3$ and quaternary $N_4$. The current $I_{cq1}$ will gradually increase in absolute value from $t_1$.

As indicated at (F) in FIG. 4, the current $I_{q2}$ through the ancillary switch $Q_2$ will rise in magnitude with the current $I_{q1}$. It is thus seen that the zero current switching of the ancillary switch $Q_2$ is accomplished at $t_1$, with little or no power loss when this switch is turned on. A voltage will develop across the transformer secondary $N_2$ in a direction to reverse bias the output rectifying diode $D_0$ during the ensuing $t_1$–$t_2$ period when the current $I_{q2}$ flows through the transformer tertiary $N_3$ and quaternary $N_4$ as at (F) in FIG. 4. The diode $D_0$ will then become nonconductive, with no flow of current $I_{do}$ therethrough as at (M) in FIG. 4.

During this same $t_1$–$t_2$ period there is some flow of current $I_{L1}$, as at (H) in FIG. 4, along the path comprising the second rectifier output conductor 44, first inductance coil $L_1$, transformer quaternary $N_4$, first ancillary diode $D_a$, ancillary switch $Q_2$, and third rectifier output conductor 45. There is also some flow of current $I_{L2}$, as at (I) in FIG. 4, along the path comprising the first rectifier output conductor 43, second inductance coil $L_2$, smoothing capacitor $C_1$ and third rectifier output conductor 45.

Upon completion of discharge by the soft switching capacitor $C_{q1}$ at $t_2$, the current $I_{q1}$ shown at (D) in FIG. 4 will start flowing along the path comprising the transformer tertiary $N_3$, transformer quaternary $N_4$, first ancillary diode $D_a$, ancillary switch $Q_2$, primary switch protection diode $D_{q1}$, and transformer primary $N_1$, due to the liberation of the energy that has been stored on the transformer primary $N_1$, tertiary $N_3$ and quaternary $N_4$. The current $I_{q1}$ is shown at (D) in FIG. 4 as the sum of the current through the primary switch $Q_1$ and the current through its protection diode $D_{q1}$. However, this current $I_{q1}$ will be referred to as the primary switch current for simplicity.

The current $I_{db}$, at (L) in FIG. 4, will also flow during the $t_2$–$t_3$ period along the path comprising the transformer quaternary $N_4$, first ancillary diode $D_a$, ancillary switch $Q_2$, and second ancillary diode $D_b$, due to the liberation of the energy from the transformer quaternary $N_4$. The current $I_{q2}$ through the ancillary switch $Q_2$ will start diminishing at $t_2$, as at (F) in FIG. 4, so that the primary switch current $I_{q1}$ flowing through the primary switch protection diode $D_{q1}$ will drop to zero at $t_3$.

Since the primary switch protection diode $D_{q1}$ is conductive from $t_2$ to $t_3$, the voltage $V_{q1}$ across the primary switch $Q_1$ is approximately zero during this period. The zero voltage switching of the primary switch $Q_1$ is therefore accomplished if it is turned on during the $t_2$–$t_3$ period. The primary switch control signal $V_{g1}$ is shown at (A) in FIG. 4 as going high at $t_2$ for ease of explanation. However, in consideration of possible fluctuations in the moment the primary switch $Q_1$ is turned on in practice, it is desirable and practical that the primary switch be turned on midway between $t_2$ and $t_3$.

It must nevertheless be pointed out that the primary switch $Q_1$ may be turned on before $t_2$ when the voltage $V_{q1}$ across the same becomes zero, and not earlier than $t_1$ when it starts dwindling. Switching loss will then diminish to an extent to which the voltage $V_{q1}$ has dropped at the moment the primary switch is turned on.

Some reduction of switching loss is also possible if the primary switch $Q_1$ is turned on shortly after $t_3$. With the primary switch $Q_1$ held open at $t_3$, the resonance capacitor $C_{q1}$ will start to be charged at that moment. But if the primary switch $Q_1$ is turned on while the voltage across this capacitor $C_{q1}$ is still less than the voltage $V_{q1}$ across the primary switch during its nonconducting periods, then a corresponding reduction of the switching loss will be realized. Broadly speaking, therefore, the primary switch $Q_1$ may be turned on at any moment after $t_1$ when the ancillary switch $Q_2$ conducts, provided that the voltage $V_{q1}$ across the primary switch is less than that during the nonconducting period before $t_1$.

Since FIG. 4 is explanatory of what is taking place from $t_1$ to $t_6$ in FIG. 5, the primary switch protection diode $D_{q1}$ is understood to conduct at $t_2$ in FIG. 4. With a drop in the potential at the junction 10 between the transformer tertiary $N_3$ and quaternary $N_4$, the current $I_{L1}$ through the first inductance coil $L_1$ will start increasing as at (H) in FIG. 4. This current $I_{L1}$ will flow along the path comprising the second rectifier output conductor 44, first inductance coil $L_1$, transformer quaternary $N_4$, first ancillary diode $D_a$, ancillary switch $Q_2$, and third rectifier output conductor 45. As depicted at (I) in FIG. 4, the current $I_{L2}$ through the second inductance coil $L_2$ will continue flowing during the $t_2$–$t_3$ period, as during the $t_1$–$t_2$ period, but dwindle to zero at $t_3$.

At $t_3$, when the primary switch protection diode $D_{q1}$ becomes incapable of being held conductive, the current $I_{q1}$ through the primary switch $Q_1$ will become zero and thereafter start flowing positive as at (D) in FIG. 4. Thus, during the ensuing $t_3$–$t_4$ period, the primary switch current $I_{q1}$ will flow along both the path comprising the first a.c. input terminal 1, filter 3, fifth diode $D_5$, first inductance coil $L_1$, transformer tertiary $N_3$, transformer primary $N_1$, primary switch $Q_1$, fourth diode $D_4$, filter 3, and second a.c. input terminal 2, and the path comprising the smoothing capacitor $C_1$, transformer primary $N_1$, and primary switch $Q_1$.

It is understood that energy release from the transformer quaternary $N_4$ comes to an end at $t_4$, rather than at $t_3$, with the result that the current $I_{q2}$ flows during the $t_3$–$t_4$ period, as at (F) in FIG. 4, along the path comprising the transformer quaternary $N_4$, first ancillary diode $D_a$, ancillary switch $Q_2$, smoothing capacitor $C_1$, and transformer tertiary $N_3$. The rectifying diode $D_0$ will be reverse biased by the voltage building up across the transformer secondary $N_2$ when the primary switch current $I_{q1}$ is going positive as from $t_3$ to $t_4$, and from $t_4$ to $t_5$, in FIG. 4. The current $I_{do}$ through this diode $D_0$ will therefore remain zero as at (M) in FIG. 4.

The current $I_{q2}$ through the ancillary switch $Q_2$ will be zero as at (F) in FIG. 4, whereas the current $I_{q1}$ through the primary switch $Q_1$ will flow as at (D) in FIG. 4, from $t_4$ to $t_5$. During this period, as from $t_3$ to $t_4$, there will be current flow both along the first path comprising the first a.c. input terminal 1, filter 3, fifth diode $D_5$, first inductance coil $L_1$, transformer tertiary $N_3$, transformer primary $N_1$, primary switch $Q_1$, fourth diode $D_4$, filter 3, and second a.c. input terminal 2, and along the path comprising the smoothing capacitor $C_1$, transformer primary $N_1$, and primary switch $Q_1$. The current on the first path is equivalent to the first inductance coil current $I_{L1}$ shown at (H) in FIG. 4. The current on the second path is equivalent to the smoothing capacitor current $I_{C1}$ during the $t_4$–$t_5$ period at (K) in FIG. 4. The current $I_{q1}$ through the primary switch $Q_1$ is the sum of the currents on the first and the second path. The first and third diodes $D_1$ and $D_3$ of the rectifier circuit 4 are both reverse biased during this $t_4$–$t_5$ period by the voltage developing across the second inductance coil $L_2$, which is electromagnetically coupled to the first inductance coil $L_1$, so that there is no current flow through the second inductance coil $L_2$.

The voltage $V_{q2}$ across the ancillary switch $Q_2$ is zero from $t_4$ to $t_5$, as at (E) in FIG. 4. The current $I_{q2}$ through the ancillary switch $Q_2$ is zero from $t_4$ to $t_5$, as at (F) in FIG. 4. The ancillary switch $Q_2$ may therefore be turned off at any moment during this $t_4$–$t_5$ period for both zero-voltage and zero-current switching. The conduction control of the ancillary switch $Q_2$ is shown to end at $t_5$ when that of the primary switch $Q_1$ also ends, in this particular embodiment of the invention. The zero-voltage and zero-current switching of the ancillary switch $Q_2$ is thus accomplished for reduction of switching loss when the ancillary switch $Q_2$ is turned off. In practice, of course, the ancillary switch $Q_2$ may be turned off at any other moment from $t_4$ to $t_5$.

As plotted at (D) in FIG. 4, the current $I_{q1}$ through the primary switch $Q_1$ will drop to zero at $t_5$ when this switch is turned off. The current $I_{cq1}$ will flow instead into the soft switching capacitor $C_{q1}$, as at (G) in FIG. 4, thereby charging the same. The voltage $V_{q1}$ across the primary switch $Q_1$ will rise with a gradient as at (C) in FIG. 4. The zero-voltage turnoff of the primary switch $Q_1$ has thus been achieved. The current charging the soft switching capacitor $C_{q1}$ as above will flow both along the path comprising the rectifier circuit 4, first inductance coil $L_1$, transformer tertiary $N_3$, transformer primary $N_1$, and soft switching capacitor $C_{q1}$, and along the path comprising the smoothing capacitor $C_1$, transformer primary $N_1$, and soft switching capacitor $C_{q1}$.

The voltage across the soft switching capacitor $C_{q1}$ will gradually build up after $t_5$ when both primary switch $Q_1$ and ancillary switch $Q_2$ turn off. Thereupon the voltage impressed to the transformer primary $N_1$ from the smoothing capacitor $C_1$ will diminish until it becomes practically zero at $t_6$.

The transformer 5 will commence liberation of the stored energy at $t_6$ when the primary switch $Q_1$ completely goes off. The diode $D_0$ of the rectifying and smoothing circuit 6 will then be forward biased by the voltage across the transformer secondary $N_2$, with the result that the diode current $I_{do}$ will start flowing as at (M) in FIG. 4. A voltage will develop across the transformer tertiary $N_3$, which is electromagnetically coupled to the transformer secondary $N_2$, with the indicated polarity when the primary switch $Q_1$ is off. The potential at the junction 10 between the transformer tertiary $N_3$ and quaternary $N_4$ will therefore be higher than the voltage across the smoothing capacitor $C_1$ by the voltage across the transformer tertiary $N_3$. The current $I_{L1}$ through the first inductance coil $L_1$ will start diminishing at $t_6$, as at (H) in FIG. 4.

On the other hand, being electromagnetically coupled to the first inductance coil $L_1$, the second inductance coil $L_2$ will give rise to a voltage forwardly biasing the first and third diodes $D_1$ and $D_3$ of the rectifier circuit 4 with a rise in the potential at the junction 10 between the transformer tertiary $N_3$ and quaternary $N_4$ when the primary switch $Q_1$ is off. The current $I_{L2}$ through the second inductance coil $L_2$ will start flowing at $t_6$, as at (I) in FIG. 4.

Flowing along the path comprising the rectifier circuit 4, first inductance coil $L_1$, transformer tertiary $N_3$, and smoothing capacitor $C_1$, the current $I_{L1}$ shown at (H) in FIG. 4 will diminish in magnitude with energy release from the first inductance coil $L_1$ until it becomes zero at $t_7$. As indicated at (I) in FIG. 4, on the other hand, the current $I_{L2}$ on the second inductance coil $L_2$, which flows along the path comprising the rectifier circuit 4, second inductance coil $L_2$, and smoothing capacitor $C_1$, will gradually rise in magnitude until $t_7$ and dwindle thereafter. These inductance coil currents $I_{L1}$ and $I_{L2}$ combine into the smoothing capacitor current $I_{C1}$.

The $t_7$–$t_8$ period is a repetition of the pre-$t_1$ period in FIG. 4. Due to energy release from the second inductance coil $L_2$, the current $I_{L2}$ will flow along the path comprising the rectifier circuit 4, second inductance coil $L_2$, and smoothing capacitor $C_1$.

One cycle of operation comes to an end at $t_8$. Another similar cycle will restart at $t_8$ when the ancillary switch $Q_2$ is turned on again.

The advantages gained by this particular embodiment of the invention may be recapitulated as follows:

1. The primary switch $Q_1$ is turned both on and off at zero voltage, assuring less switching loss, higher efficiency, and less noise production.
2. The ancillary switch $Q_2$ is turned on at zero current and off at zero voltage and zero current, resulting in less switching loss and noise production.
3. The currents $I_{L1}$ and $I_{L2}$ flowing through the inductance coils $L_1$ and $L_2$ change in peak values with the amplitude of the a.c. input voltage $V_{ac}$, with consequent improvements in a.c. input power factor and waveform. Such improvements in power factor and waveform are accomplished with the aid of the primary switch $Q_1$ in the d.c.-to-d.c. converter circuit comprising the smoothing capacitor $C_1$, transformer 5, primary switch $Q_1$, and rectifying and smoothing circuit 6. The objectives of improved power factor, improved waveform, and output voltage control are realized with the simple circuitry.
4. The ancillary circuit 7 for the soft switching of the primary switch $Q_1$ makes use of the windings $N_3$ and $N_4$ which are incorporated with the transformer 5 as its tertiary and quaternary, thereby avoiding too much increase in the size and cost of the power supply.
5. By reason of the connection of the first inductance coil $L_1$ to the junction 10 between the transformer tertiary $N_3$ and quaternary $N_4$, the current $I_{L1}$ does not flow through this first inductance coil even if the primary switch is closed, unless the potential on the first rectifier output conductor 44 grows higher than that at the junction 10. The first inductance coil current $I_{L1}$ does not flow for this reason during the $t_0$–$t_1$, $t_6$–$t_8$, and $t_9$–$t_{10}$ periods in FIG. 3. Although this is disadvantageous purely from the standpoints of waveform and power factor improvements, it should also be taken into account that power loss does not occur at the first inductance coil $L_1$ as long as there is no current flow therethrough. Higher efficiency may therefore be attained without sacrifice in waveform and power factor through adjustment of the turns of the transformer primary $N_1$, tertiary $N_3$ and quaternary $N_4$ and of the periods of current flow through the first inductance coil $L_1$.

Figure 6:
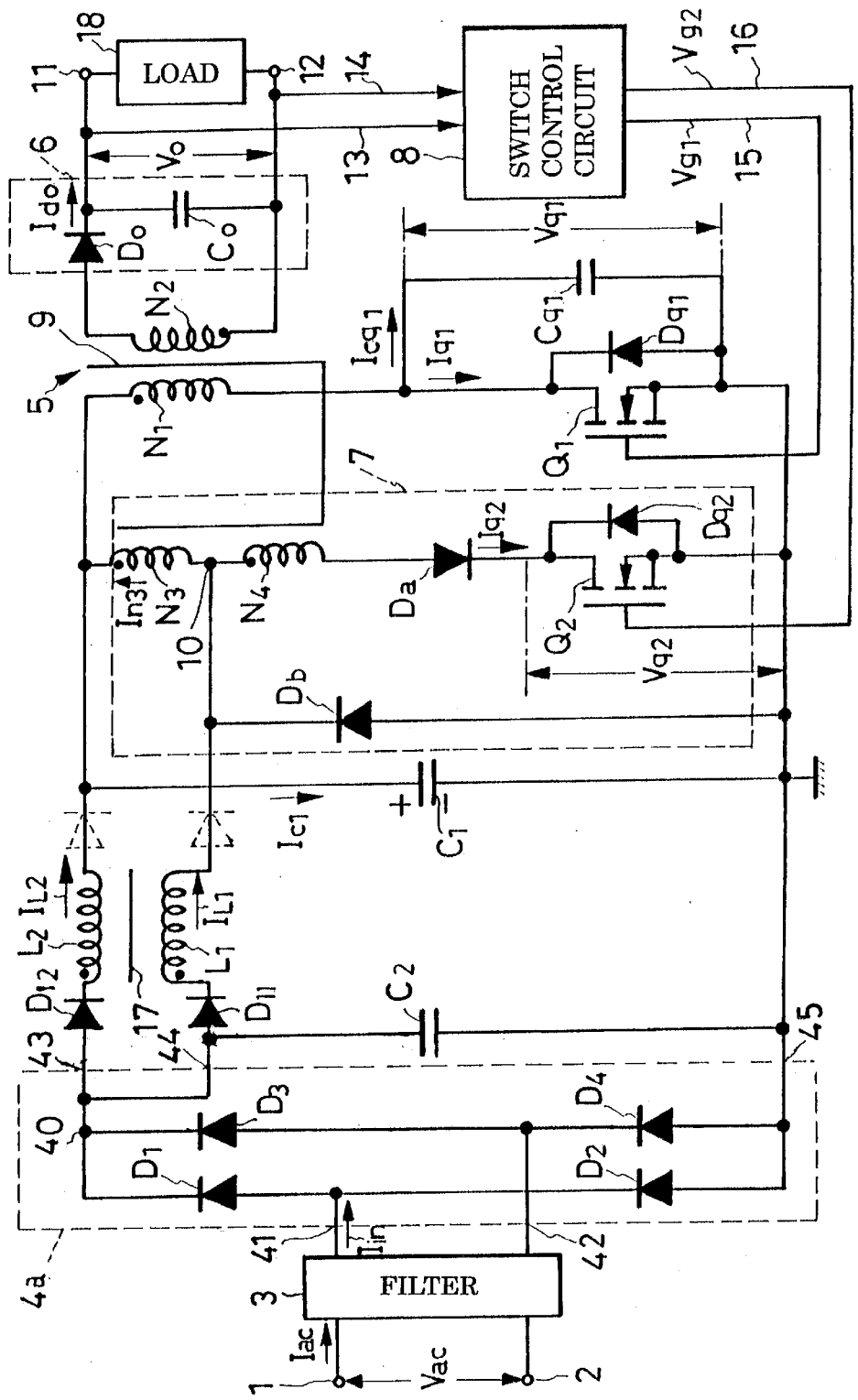
FIG. 6 is a view similar to FIG. 1 but showing a second preferred form of switching power supply according to the invention.

Embodiment of FIG. 6

This alternative form of switching power supply features a rectifier circuit $4_a$ in substitution for the FIG. 1 rectifier circuit 4, and an addition of two reverse-blocking diodes $D_{11}$ and $D_{12}$ and a bypass capacitor $C_2$. All the other details of construction are as set forth above with reference to FIGS. 1 and 2.

The modified rectifier circuit $4_a$ differs from its FIG. 1 counterpart 4 in having but four diodes $D_1$–$D_4$, instead of six, which are of the same connections as their equivalents in the FIG. 1 circuit 4. As the modified rectifier circuit $4_a$ does not have the diodes $D_5$ and $D_6$ of the FIG. 1 circuit 4, the junction 40 between the first and third diodes $D_1$ and $D_3$ is connected to both first and second rectifier output conductors 43 and 44. These rectifier output conductors 43 and 44 are connected to the inductance coils $L_2$ and $L_1$ via reverse-blocking diodes $D_{12}$ and $D_{11}$, respectively. The reverse-blocking diodes $D_{11}$ and $D_{12}$ could be connected on the output sides of the inductance coils $L_1$ and $L_2$, as indicated in phantom outline in this figure.

The bypass capacitor $C_2$ is connected between the third rectifier output conductor 45 and the junction 40 between the rectifier diodes $D_1$ and $D_3$. The higher frequency component produced by the operation of the primary switch $Q_1$ does not flow through the four rectifier diodes $D_1$–$D_4$ but to the bypass capacitor $C_2$. There is therefore less noise production by the rectifier diodes $D_1$–$D_4$. Inexpensive low-frequency diodes find use as the four rectifier diodes $D_1$–$D_4$ purely for rectification of the low-frequency input voltage $V_{ac}$, because no high-frequency current is to flow through these diodes $D_1$–$D_4$. The reverse-blocking diodes $D_{11}$ and $D_{12}$ should be high-frequency devices capable of response to the switching frequency of the primary switch $Q_1$.

Fundamentally, the FIG. 6 power supply operates the same way as does the FIG. 1 device and so gains the same advantages therewith. The advantages peculiar to this embodiment are as set forth previously.

Figure 7:
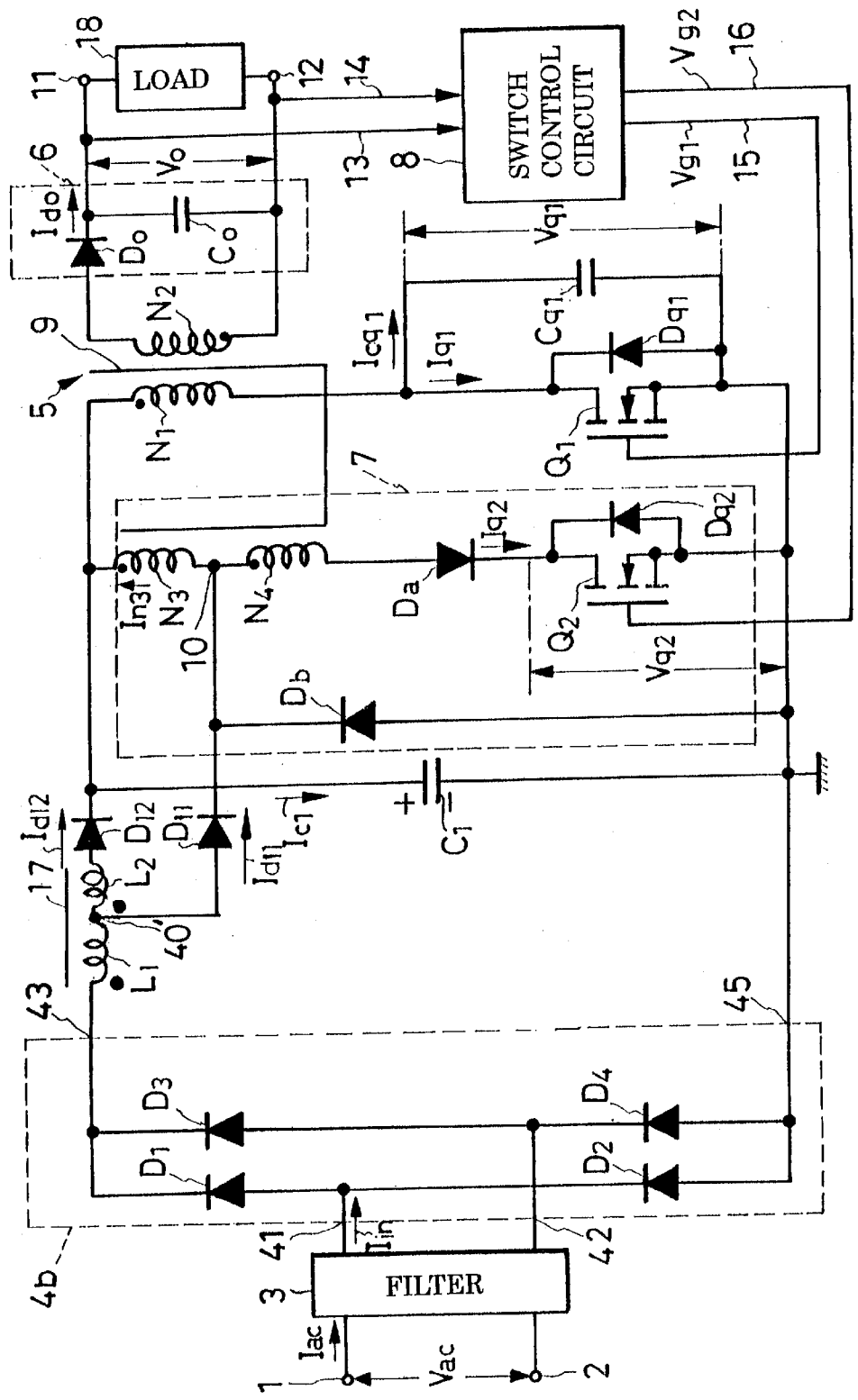
FIG. 7 is also a view similar to FIG. 1 but showing a third preferred form of switching power supply according to the invention.
Figure 8:
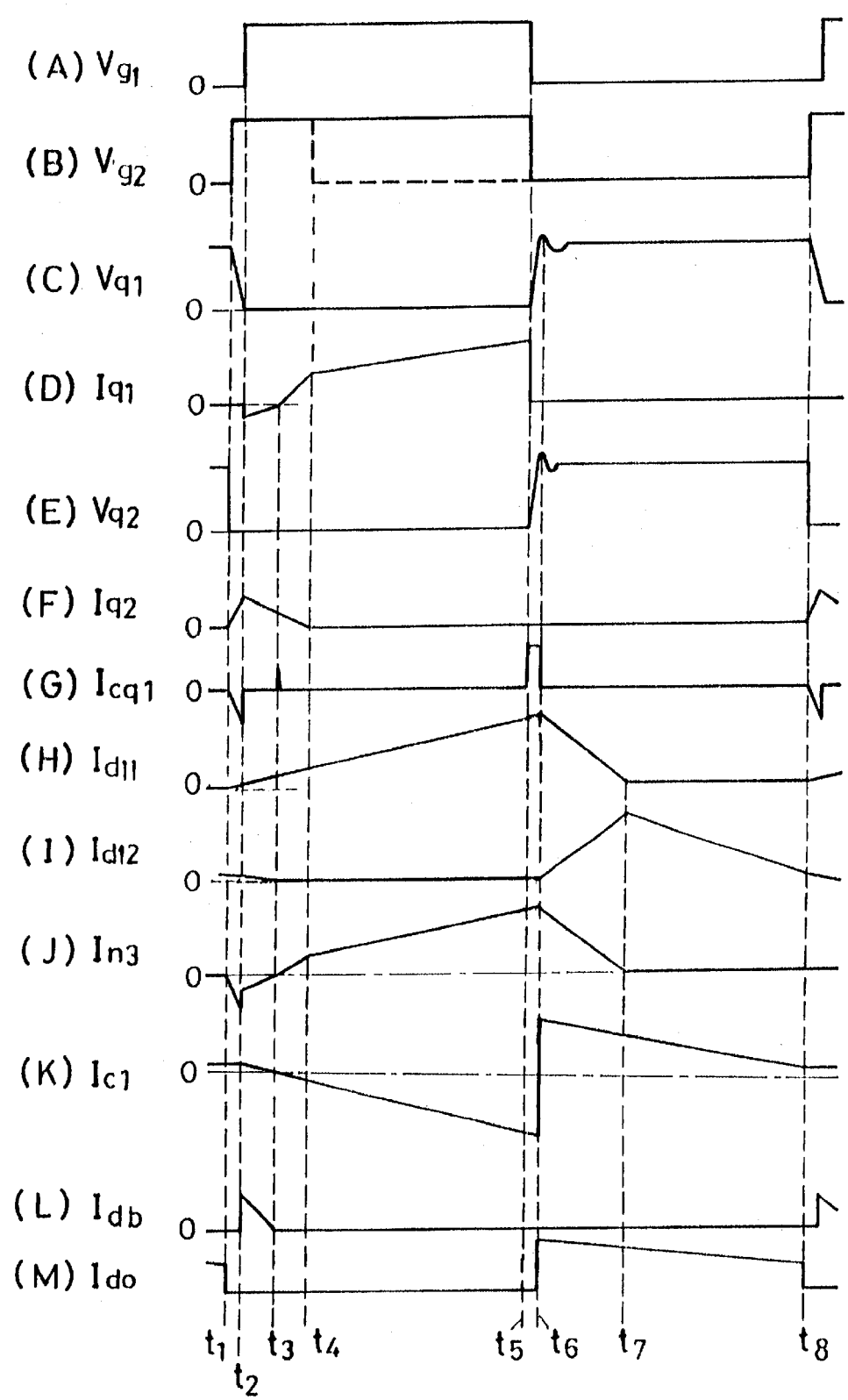
FIG. 8, consisting of (A) through (M), is a series of diagrams showing the voltage and current waveforms appearing at various parts of the FIG. 7 device in order to explain how the primary switch is soft-switched according to the invention.

Embodiment of FIGS. 7 and 8

A comparison of FIGS. 1 and 7 will reveal that this third preferred embodiment differs from that of FIG. 1 in: (a) the construction of another modified rectifier circuit $4_b$; (b) the connections of inductance coils $L_1$ and $L_2$; and (c) the addition of reverse-blocking diodes $D_{11}$ and $D_{12}$.

The rectifier circuit $4_b$ is similar to the FIG. 6 rectifier circuit $4_a$ in having four diodes $D_1$–$D_4$ but differs therefrom, and from the FIG. 1 rectifier circuit 4 too, in having but two output conductors 43 and 45. This pair of output conductors 43 and 45 are for production of a full-wave rectified output voltage.

Intended for improvements in power factor and waveform as in the foregoing embodiments, the two inductance coils $L_1$ and $L_2$ are electromagnetically coupled together, being both wound on a magnetic core 17, and polarized in the same direction. The first inductance coil $L_1$ has one extremity thereof connected to the first rectifier output conductor 43, and the other extremity connected to one extremity of the second inductance coil $L_2$ and, via the first reverse-blocking diode $D_{11}$ to the junction 10 between the transformer tertiary $N_3$ and quaternary $N_4$. The other extremity of the second inductance coil $L_2$ is connected to the smoothing capacitor $C_1$ via the second reverse-blocking diode $D_{12}$. The two inductance coils $L_1$ and $L_2$ may be formed by tapping a winding at 40'. The second reverse-blocking diode $D_{12}$ could be connected between the tap or junction 40 and the second inductance coil $L_2$.

The FIG. 7 power supply operates essentially the same way as that of FIG. 1 as the switch control pulses $V_{g1}$ and $V_{q2}$, shown at (A) and (B) in FIG. 8, are impressed respectively to the primary switch $Q_1$ and ancillary switch $Q_2$ from the switch control circuit 8 while the commercial sinusoidal a.c. voltage $V_{ac}$, (D) in FIG. 5, is being applied to the pair of a.c. input terminals 1 and 2. The input current $I_{in}$, (B) in FIG. 5, of the rectifier circuit 4 will change in amplitude with that of the a.c. input voltage $V_{ac}$, with the result that the a.c. input current $I_{ac}$, (C) in FIG. 5, closely approximates a sinusoidal wave for improvements in power factor and waveform.

Since the first inductance coil $L_1$ is connected via the reverse-blocking diode $D_1$ to the junction 10 between the transformer tertiary $N_3$ and quaternary $N_4$, the current $I_{L1}$ will flow through the first inductance coil $L_1$ when the potential on the first rectifier output conductor 43 is higher than that of the junction 10 which is due to the voltage $V_{c1}$ across the smoothing capacitor $C_1$. The rectifier input current $I_{in}$ and a.c. input current $I_{ac}$ are shown to flow from $t_1$ to $t_6$, and from $t_8$ to $t_9$, in FIG. 5.

The operation of the FIG. 7 power supply exclusive of the ancillary soft switching circuit 7 will be explained in some more detail. Current will flow along the path comprising the first rectifier output conductor 43, first inductance coil $L_1$, first reverse-blocking diode $D_1$, transformer tertiary $N_3$, transformer primary $N_1$, and primary switch $Q_1$ during each conducting period $T_{on}$ of this switch $Q_1$, as from $t_2$ to $t_3$ in FIG. 5. Current will flow at the same time along the path comprising the smoothing capacitor $C_1$, transformer primary $N_1$, and primary switch $Q_1$. The voltage appearing across the transformer secondary $N_2$ during each such period $T_{on}$ will be oriented to reverse-bias the diode $D_0$ of the rectifying and smoothing circuit 6, holding this diode nonconductive. Energy will therefore be stored on the transformer 5, as well as on the first inductance coil $L_1$.

During each nonconducting period $T_{off}$ of the primary switch $Q_1$, on the other hand, as from, $t_3$ to $t_5$ in FIG. 5, both first inductance coil $L_1$ and transformer 5 will release the energy they have stored during the preceding conducting period $T_{on}$. Current will then flow along the path comprising the first rectifier output conductor 43, first inductance coil $L_1$, first reverse-blocking diode $D_{11}$, transformer tertiary $N_3$, and smoothing capacitor $C_1$ thereby charging this capacitor. A charging current will also flow along the path comprising the first rectifier output conductor 43, first inductance coil $L_1$, second inductance coil $L_2$, second reverse-blocking diode $D_{12}$, and smoothing capacitor $C_1$. The current charging the smoothing capacitor $C_1$ during each primary switch nonconducting period $T_{off}$ will diminish with time. Although FIG. 5 shows the charging current $I_{in}$ as flowing throughout each primary switch nonconducting period $T_{off}$, this current may be made to cease flowing before the end of the nonconducting period, as at $t_4$ in FIG. 5. The inductance values of the coils $L_1$ and $L_2$ may be readjusted for such termination of the charging current flow earlier than the end of each nonconducting period $T_{off}$.

As the transformer 5 liberates the stored energy during each primary switch nonconducting period $T_{off}$ there will be induced on the transformer secondary $N_2$ a voltage oriented to cause conduction through the diode $D_0$ of the rectifying and smoothing circuit 6. The result will be power delivery to both capacitor $C_0$ and load 13. Another cycle of operation will restart at $t_5$ in FIG. 5 when the primary switch $Q_1$ reconducts. The output voltage $V_o$ of the FIG. 7 power supply is held constant by the same method as in that of FIG. 1.

What follows is the operational description of the ancillary soft-switching circuit 7 with reference had to the waveform diagram of FIG. 8. This figure is explanatory of what is taking place in the FIG. 7 power supply during part of the $t_1$–$t_6$ period of FIG. 5. As will be noted from (A) and (B) in FIG. 8, both primary switch $Q_1$ and ancillary switch $Q_2$ have been off before $t_1$. Operation during this pre-$t_1$ period is similar to that of the $t_3$–$t_5$ period in FIG. 5. The diode current $I_{do}$ flows as at (M) in FIG. 8, and the primary switch voltage $Q_{q1}$ and ancillary switch voltage $V_{q2}$ are both high as at (C) and (E) in FIG. 8.

At (G) in FIG. 8 is shown the current $I_{cq1}$ due to the discharge of the soft-switching capacitor $C_{q1}$ upon conduction of the ancillary switch $Q_2$ at $t_1$. The discharge current $I_{cq1}$ will flow both along a path comprising the soft-switching capacitor $C_{q1}$, transformer primary $N_1$, transformer tertiary $N_3$, transformer quaternary $N_4$, ancillary diode $D_a$, and ancillary switch $Q_2$, and along a path comprising the soft-switching capacitor $C_{q1}$, transformer primary $N_1$, and smoothing capacitor $C_1$. The voltage $V_{q1}$ across the primary switch $Q_1$ will diminish until it zeroes at $t_2$, as at (C) in FIG. 8.

Since the transformer tertiary $N_3$ and quaternary $N_4$, both connected in series with the ancillary switch $Q_2$, are inductive, the soft-switching capacitor discharge current $I_{cq1}$ flows due to the resonance of the capacitance of the capacitor $C_{q1}$ and the inductances of the transformer tertiary $N_3$ and quaternary $N_4$. The absolute value of this discharge current $I_{cq1}$ will start rising gradually at $t_1$, as at (G) in FIG. 8. As indicated at (F) in FIG. 8, moreover, the current $I_{q2}$ through the ancillary switch $Q_2$ will also rise gradually. Thus is accomplished the zero-current turning-on of the ancillary switch $Q_2$ at $t_1$.

As the current $I_{q2}$ starts flowing through the transformer tertiary $N_3$ and quaternary $N_4$ at the beginning of the $t_1$–$t_2$ period, there will develop across the transformer secondary $N_2$ a voltage oriented to reverse-bias the output rectifier diode $D_0$. The current $I_{do}$ through the diode $D_0$ will drop to zero, as at (M) in FIG. 8, upon nonconduction of this diode.

During this same $t_1$–$t_2$ period there will be some flow of current $I_{d11}$, at (H) in FIG. 8, along the path comprising the first rectifier output conductor 43, first inductance coil $L_1$, first reverse-blocking diode $D_{11}$, transformer quaternary $N_4$, first ancillary diode $D_a$, ancillary switch $Q_2$, and second rectifier output conductor 45. There will also be some flow of current $I_{d12}$, at (I) in FIG. 8, along the path comprising the first rectifier output conductor 43, first inductance coil $L_1$, second inductance coil $L_2$, second reverse-blocking diode $D_{12}$, smoothing capacitor $C_1$, and second rectifier output conductor 45.

Upon completion of discharge by the soft switching capacitor $C_{q1}$ at $t_2$, the current $I_{q1}$ will start flowing as at (D) in FIG. 8 due to the release of the energy that has been stored on the inductive transformer primary $N_1$, tertiary $N_3$ and quaternary $N_4$. The path of the current $I_{q1}$ comprises the transformer tertiary $N_3$, transformer quaternary $N_4$, first ancillary diode $D_a$, ancillary switch $Q_2$, primary switch protection diode $D_{q1}$, and transformer primary $N_1$. The current $I_{q1}$ is shown at (D) in FIG. 8 as sum of the drain-source current of the primary switch $Q_1$ and the current through the protection diode $D_{q1}$. However, the current $I_{q1}$ will be referred to as the primary switch current for simplicity.

The current $I_{db}$ shown at (L) in FIG. 8 will also flow during this $t_2$–$t_3$ period due to energy release from the transformer quaternary $N_4$. The path of the current $I_{db}$ comprises the transformer quaternary $N_4$, first ancillary diode $D_a$, ancillary switch $Q_2$, and second ancillary diode $D_b$. The current $I_{q2}$ through the ancillary switch $Q_2$ will start diminishing at $t_2$, as shown at (F) in FIG. 8, so that the primary switch current $I_{q1}$ will become zero at $t_3$. The voltage $V_{q1}$ across the primary switch $Q_1$ is remains approximately zero from $t_2$ to $t_3$ because its protection diode $D_{q1}$ is conductive during this period.

It is thus seen that the primary switch $Q_1$ can be turned on at zero voltage during the $t_2$–$t_3$ period of FIG. 8. The primary switch control signal $V_{g1}$ is shown at (A) in FIG. 8 as going high at $t_2$ solely in order to expedite explanation. In practice the primary switch $Q_1$ may be turned on intermediate $t_2$ and $t_3$ in consideration of possible fluctuations in turn-on control.

It is not a prerequisite, however, that the primary switch $Q_1$ be turned on at or after $t_2$ when the voltage $V_{q1}$ across the same becomes zero. The primary switch $Q_1$ may be turned earlier than $t_2$, but later than $t_1$ when the voltage $V_{q1}$ starts decreasing. Switching loss will be reduced even then to an extent depending upon the drop of the voltage $V_{q1}$ from its pre-$t_1$ value. Some reduction of switching loss is also possible if the primary switch $Q_1$ is turned on shortly after $t_3$. The resonance capacitor $C_{q1}$ will start to be charged at $t_3$ if then the primary switch $Q_1$ remains off. But switching loss will lessen if the primary switch $Q_1$ is turned on when the voltage across the capacitor $C_{q1}$ is still less than the voltage $V_{q1}$ during the pre-$t_1$ period when the primary switch is off. Broadly speaking, therefore, the primary switch $Q_1$ may be turned on not earlier than t, when the ancillary switch $Q_2$ is turned on and while the voltage $V_{q1}$ across the primary switch $Q_1$ is less than that during the pre-$t_1$ period.

Since FIG. 8 is explanatory of what is going on from $t_1$ to $t_6$ in FIG. 5, the current $I_{d11}$ through the first reverse-blocking diode $D_{11}$ is shown at (H) in FIG. 8 as start rising at $t_2$ when the primary switch protection diode $D_{q1}$ conducts with a consequent drop in the potential at the junction 10 between the transformer tertiary $N_3$ and quaternary $N_4$. This current $I_{d11}$ will flow along the path comprising the first rectifier output conductor 43, first inductance coil $L_1$, first reverse-blocking diode $D_{11}$, transformer quaternary $N_4$, first ancillary diode $D_a$, ancillary switch $Q_2$, and second rectifier output conductor 45. As indicated at (I) in FIG. 8, the current $I_{d12}$ through the second reverse-blocking diode $D_{12}$ will continue flowing from $t_2$ to $t_3$, as from t, to $t_2$, but dwindle to zero at $t_3$.

The current $I_{q1}$ through the primary switch $Q_1$ will become zero at $t_3$ when the primary switch protection diode $D_{q1}$ goes off, as at (D) in FIG. 8. The primary switch current $I_{q1}$ will flow positive during the ensuing $t_3$–$t_4$ period, both along the first path comprising the first rectifier output conductor 43, first inductance coil $L_1$, first reverse-blocking diode $D_{11}$, transformer tertiary $N_3$, transformer primary $N_1$, primary switch $Q_1$, and second rectifier output conductor 45, and along the second path comprising the smoothing capacitor $C_1$, transformer primary $N_1$, and primary switch $Q_1$.

Energy release from the transformer quaternary $N_4$ is understood to terminate at $t_4$, rather than $t_3$, in this particular embodiment of the invention. For this reason the ancillary switch current $I_{q2}$ is shown at (F) in FIG. 8 to flow from $t_3$ to $t_4$ along the path comprising the transformer quaternary $N_4$, first ancillary diode $D_a$, ancillary switch $Q_2$, smoothing capacitor $C_1$, and transformer tertiary $N_3$.

While the primary switch current $I_{q1}$ is going positive as from $t_3$ to $t_4$, and from $t_4$ to $t_5$ in FIG. 8, there will develop across the transformer quaternary $N_2$ a voltage that will reverse-bias the diode $D_0$ of the rectifying and smoothing circuit 6. The current $I_{do}$ through this diode $D_0$ will therefore remain zero as at (M) in FIG. 8.

From $t_4$ to $t_5$ the current $I_{q2}$ through the ancillary switch $Q_2$ will stay zero as at (F) in FIG. 8 whereas the primary switch current $I_{q1}$ will continue flowing as at (D) in FIG. 8. During this period, as from $t_3$ to $t_4$, there will be current flow both along the first path comprising the first a.c. input terminal 1, noise filter 3, first diode $D_1$, first inductance coil $L_1$, first reverse-blocking diode $D_{11}$, transformer tertiary $N_3$, transformer primary $N_1$, primary switch $Q_1$, fourth diode $D_4$, noise filter 3, and second a.c. input terminal 2, and along the second path comprising the smoothing capacitor $C_1$, transformer primary $N_1$, and primary switch $Q_1$. The current over the first path above is equivalent to the current $I_{d11}$, shown at (H) in FIG. 8, through the first reverse-blocking diode $D_{11}$. The current over the second path is equivalent to the smoothing capacitor current $I_{c1}$ of the $t_4$–$t_5$ (period at (K) in FIG. 8. The primary switch current $I_{q1}$ is the sum of the currents flowing along the two paths defined above. A voltage that reverse-biases the second reverse-blocking diode $D_{12}$ will develop across the second inductance coil $L_2$, which is electromagnetically coupled to the first inductance coil $L_1$, during this $t_4$–$t_5$ period. There is therefore no current flow through the second inductance coil $L_2$.

The ancillary switch voltage $V_{q2}$ is zero, as at (E) in FIG. 8, and so is the ancillary switch current $I_{q2}$, as at (F) in FIG. 8, from $t_4$ to $t_5$. Consequently, the ancillary switch $Q_2$ may be turned on at any moment during this period, for both zero-voltage and zero-current switching. Both primary switch $Q_1$ and ancillary switch $Q_2$ are understood to go off at the same moment, as at $t_5$ in FIG. 8, in this particular embodiment, so that the zero-voltage and -current turnoff of the ancillary switch $Q_2$ is accomplished. Of course, the ancillary switch $Q_2$ could be turned off at $t_4$, as indicated by the dashed line at (B) in FIG. 8, or at any other moment from $t_4$ to $t_5$.

The primary switch current $I_{q1}$ will drop instantly to zero at $t_5$, as at (D) in FIG. 8, when the primary switch $Q_1$ is turned off. Thereupon the soft-switching capacitor $C_{q1}$ will be charged, and the primary switch voltage $V_{q1}$ will rise rather abruptly, as at (C) in FIG. 8. The primary switch $Q_1$ has thus been turned off at zero voltage. The current charging the soft-switching capacitor $C_{q1}$ will flow both along the path comprising the rectifier circuit 4, first inductance coil $L_1$, first reverse-blocking diode $D_{11}$, transformer tertiary $N_3$, transformer primary $N_1$, and soft-switching capacitor $C_{q1}$, and along the path comprising the smoothing capacitor $C_1$, transformer primary $N_1$, and soft-switching capacitor $C_{q1}$.

Both primary switch $Q_1$ and ancillary switch $Q_2$ are shown to go off at $t_5$. Thereafter, with a gradual rise in the voltage across the soft-switching capacitor $C_{q1}$, the voltage impressed to the transformer primary $N_1$ due to the smoothing capacitor $C_1$ will diminish substantially to zero at $t_6$.

The transformer 5 will start liberating its stored energy at $t_6$ when the primary switch $Q_1$ goes totally off. With the consequent development, across the transformer secondary $N_2$, of a voltage forwardly biasing the diode $D_0$, the current $I_{d0}$ will flow therethrough as at (M) in FIG. 8. A voltage will also develop with the indicated polarity across the transformer tertiary $N_3$ when the primary switch $Q_1$ is off, as this transformer tertiary is electromagnetically coupled to the secondary $N_2$. Therefore, when the primary switch $Q_1$ is off, the potential at the junction 10 between the transformer tertiary $N_3$ and quaternary $N_4$ will be higher than the voltage across the smoothing capacitor $C_1$ by an amount equal to the voltage across the transformer tertiary $N_3$. The current $I_{d11}$ through the first reverse-blocking diode $D_{11}$ will therefore start diminishing at $t_6$. A voltage forwardly biasing the second reverse-blocking diode $D_{12}$ will develop across the second inductance coil $L_2$ with a rise in the potential at the junction 10 between the transformer tertiary $N_3$ and quaternary $N_4$ when the primary switch $Q_1$ is off, as the second inductance coil $L_2$ is electromagnetically coupled to the first inductance coil $L_1$. The current $I_{d12}$ will thus start flowing through the second reverse-blocking diode $D_{12}$ at $t_6$, as at (I) in FIG. 8.

Flowing along the path comprising the rectifier circuit 4, first inductance coil $L_1$, first reverse-blocking diode $D_{11}$, transformer tertiary $N_3$, an smoothing capacitor $C_1$, the first reverse-blocking diode current $I_{d11}$ will diminish with energy liberation from the first inductance coil $L_1$, until it becomes zero at $t_7$, as at (H) in FIG. 8. On the other hand, flowing along the path comprising the rectifier circuit 4, first inductance coil $L_1$, second inductance coil $L_2$, second reverse-blocking diode $D_{12}$, and smoothing capacitor $C_1$, the second reverse-blocking diode current $I_{d12}$ will rise gradually until $t_7$ and dwindle thereafter, as at (I) in FIG. 8. The first and second reverse-blocking diode current $I_{d11}$ and $I_{d12}$ constitute in combination the smoothing capacitor current $I_{c1}$ shown at (K) in FIG. 8.

The $t_7$–$t_8$ period is a repetition of the pre-$t_1$ period in FIG. 8. The second reverse-blocking diode current $I_{d12}$ will flow with energy release from the second inductance coil $L_2$ during this period. The current $I_{d12}$ will flow along the path comprising the rectifier circuit 4, first inductance coil $L_1$, second inductance coil $L_2$, second reverse-blocking diode $D_{12}$, and smoothing capacitor $C_1$.

One cycle of switching operation, lasting from $t_1$ to $t_8$, has now come to an end. The same cycle will repeat itself after $t_8$.

Figure 9:
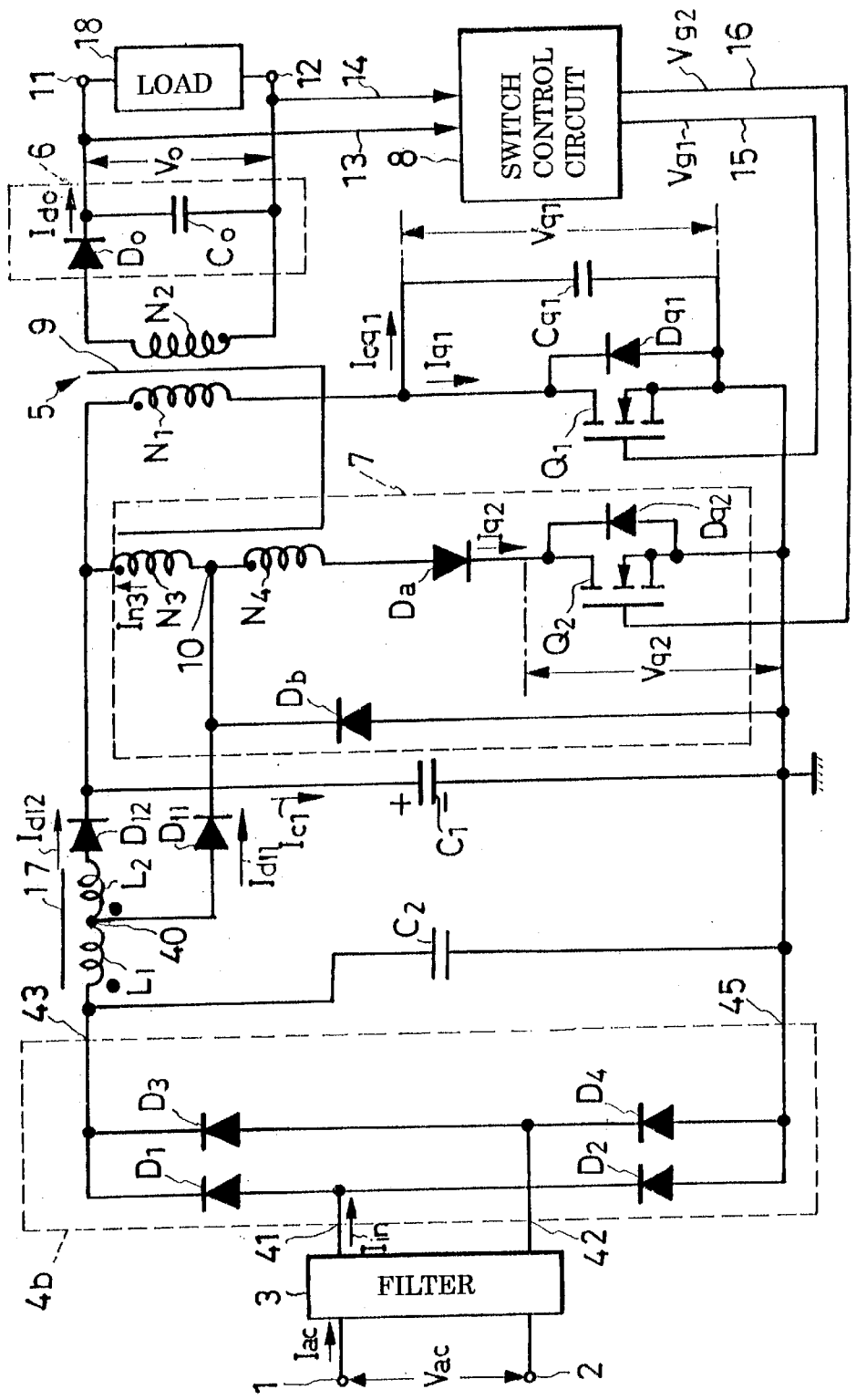
FIG. 9 is a view similar to FIG. 1 but showing a fourth preferred form of switching power supply according to the invention.

Embodiment of FIG. 9

The FIG. 9 switching power supply is akin to that of FIG. 7 except for the addition of a bypass capacitor $C_2$ similar to that used in the FIG. 6 embodiment. The bypass capacitor $C_2$ is shown connected between the rectifier output conductors 44 and 45 in FIG. 6 but between 43 and 45 in this FIG. 9 embodiment.

As has been set forth in conjunction with the FIG. 6 embodiment, the higher frequency component produced by the operation of the primary switch $Q_1$ will not flow through the four rectifier diodes $D_1$–$D_4$ but to the bypass capacitor $C_2$. There will therefore be less noise production by the rectifier diodes $D_1$–$D_4$. Inexpensive low-frequency diodes find use as the four rectifier diodes $D_1$–$D_4$ which need to serve purely for rectification of the low-frequency input voltage $V_{ac}$. The reverse-blocking diodes $D_{11}$ and $D_{12}$ should be high-frequency devices capable of sufficient response to the switching frequency of the primary switch $Q_1$.

Possible Modifications

Notwithstanding the foregoing detailed disclosure, it is not desired that the present invention be limited by the exact showing of the drawings or the description thereof. The following, then, is a brief list of possible modifications or alterations of the illustrated embodiments which are all considered to fall within the scope of the invention:

1. The bypass capacitor $C_2$ employed in the FIGS. 6 and 9 embodiments could be used in the FIG. 1 embodiment as well. Such a capacitor might be connected between the rectifier output conductors 43 and 45 and/or between the rectifier output conductors 44 and 45. However, in such cases, reverse-blocking high-frequency diodes might be connected in series with the inductance coils $L_1$ and $L_2$.
2. The transformer 5 could be an autotransformer.
3. A rectifying and smoothing circuit could be connected to the junction between transformer primary $N_1$ and primary switch $Q_1$ for provision of a step-up power supply.
4. The primary switch $Q_1$ could be made bidirectional, and the diode $D_{q1}$ omitted.
5. The second ancillary diode $D_b$ could be omitted if the current $I_{q2}$ through the ancillary switch $Q_2$ dropped to zero at $t_3$ in FIGS. 4 and 8.
6. A capacitor could be connected between the output of the first inductance coil $L_1$ and the grounded conductor 45 in both FIGS. 6 and 9 for filtration of high frequency noise.
7. The first ancillary diode $D_a$ was unnecessary if the ancillary switch $Q_2$ were equipped with the reverse-blocking function.
8. An insulated-gate bipolar transistor and other semiconductor switches could be used in place of the FET switch $Q_1$.
9. The invention could be applied to a forward switching power supply as well, as by modifying the rectifying and smoothing circuit 6 so as to cause conduction through the diode $D_0$ during the conducting periods of the primary switch $Q_1$ and by changing the polarity of the transformer secondary $N_2$.

What is claimed is:

1. A switching power supply capable of translating a.c. voltage into d.c. voltage, comprising:
   (a) a pair of a.c. input terminals for inputting a.c. voltage having a known frequency;
   (b) a pair of d.c. output terminals for outputting d.c. voltage;
   (c) a rectifier circuit connected to the pair of input terminals for rectifying the a.c. input voltage, the rectifier circuit having a first output conductor for outputting a first rectifier output voltage, a second output conductor for outputting a second rectifier output voltage which is substantially the same as the first rectifier output voltage, and a third output conductor;
   (d) a transformer having a primary winding;
   (e) a smoothing capacitor connected between a first extremity of the primary winding of the transformer and the third output conductor of the rectifier circuit;
   (f) a primary switch connected between a second extremity of the primary winding and the third output conductor of the rectifier circuit;
   (g) a rectifying and smoothing circuit connected between the transformer and the pair of d.c. output terminals for providing the d.c. output voltage;
   (h) soft-switching capacitance means connected in parallel with the primary switch;
   (i) a first ancillary winding electromagnetically coupled to the primary winding and having a first extremity connected to the first extremity of the primary winding and a first extremity of the smoothing capacitor;
   (j) a second ancillary winding electromagnetically coupled to the primary winding and to the first ancillary winding and having a first extremity connected to a second extremity of the first ancillary winding;
   (k) an ancillary switch connected in parallel with a serial connection of the primary winding and the primary switch via the first and the second ancillary winding;
   (l) a first inductance coil connected between the second output conductor of the rectifier circuit and a second extremity of the first ancillary winding;
   (m) a second inductance coil connected between the first output conductor of the rectifier circuit and the smoothing capacitor and electromagnetically coupled to the first inductance coil; and
   (n) a switch control circuit connected to the primary switch and the ancillary switch for on-off control thereof at a repetition frequency higher than the frequency of the a.c. input voltage, the switch control circuit including means for turning the ancillary switch on earlier than the primary switch is turned on and for turning the ancillary switch off not later than the primary switch is turned off;
   (o) whereby the soft-switching of the primary switch is accomplished when the primary switch is turned on.

2. The switching power supply of claim 1 wherein the rectifier circuit comprises:
   (a) a first diode having a first electrode connected to one of the pair of a.c. input terminals, and a second electrode connected to the first output conductor of the rectifier circuit;
   (b) a second diode having a first electrode connected to the third output conductor of the rectifier circuit, and a second electrode connected to said one a.c. input terminal;
   (c) a third diode having a first electrode connected to the other of the pair of a.c. input terminals, and a second electrode connected to the first output conductor of the rectifier circuit;
   (d) a fourth diode having a first electrode connected to the third output conductor of the rectifier circuit, and a second electrode connected to said other a.c. input terminal;
   (e) a fifth diode having a first electrode connected to said one a.c. input terminal, and a second electrode connected to the second output conductor of the rectifier circuit; and
   (f) a sixth diode having a first electrode connected to said other a.c. input terminal, and a second electrode connected to the second output conductor of the rectifier circuit.

3. The switching power supply of claim 1 wherein the first and the second inductance coil are connected in series with a first and a second reverse-blocking diode, respectively, and wherein the rectifier circuit comprises:
   (a) a first diode having a first electrode connected to one of the pair of a.c. input terminals, and a second electrode connected to both first and second output conductors of the rectifier circuit;

(b) a second diode having a first electrode connect to the third output conductor of the rectifier circuit, and a second electrode connected to said one a.c. input terminal;

(c) a third diode having a first electrode connected to the other of the pair of a.c. input terminals, and a second electrode connected to both first and second output conductors of the rectifier circuit; and (d) a fourth diode having a first electrode connected to the third output conductor of the rectifier circuit, and a second electrode connected to said other a.c. input terminal.

4. The switching power supply of claim 3 further comprising a bypass capacitor connected between the second and the third output conductors of the rectifier circuit, the bypass capacitor being less in capacitance than the smoothing capacitor.

5. The switching power supply of claim 1 further comprising an ancillary diode connected in series with the ancillary switch for blocking reverse current flow.

6. The switching power supply of claim 1 further comprising an ancillary diode connected in parallel with a serial connection of the second ancillary winding and the ancillary switch and so oriented as to be reverse-biased by a voltage across the smoothing capacitor.

7. A switching power supply capable of translating a.c. voltage into d.c. voltage, comprising:

(a) a pair of a.c. input terminals for inputting a.c. voltage having a known frequency;

(b) a pair of d.c. output terminals for outputting d.c. voltage;

(c) a rectifier circuit connected to the pair of input terminals for rectifying the a.c. input voltage, the rectifier circuit having a first and a second output conductor;

(d) a transformer having a primary winding;

(e) a smoothing capacitor connected between a first extremity of a primary winding of the transformer and the second output conductor of the rectifier circuit;

(f) a primary switch connected between a second extremity of the primary winding and the second output conductor of the rectifier circuit;

(g) a rectifying and smoothing circuit connected between the transformer and the pair of d.c. output terminals for providing the d.c. output voltage;

(h) soft-switching capacitance means connected in parallel with the primary switch;

(i) a first ancillary winding electromagnetically coupled to the primary winding and having a first extremity connected to the first extremity of the primary winding and the smoothing capacitor;

(j) a second ancillary winding electromagnetically coupled to the primary winding and to the first ancillary winding and having a first extremity connected to a second extremity of the first ancillary winding;

(k) an ancillary switch connected in parallel with a serial connection of the primary winding and the primary switch via the first and the second ancillary winding;

(l) a first inductance coil having a first extremity connected to the first output conductor of the rectifier circuit;

(m) a second inductance coil connected between a second extremity of the first inductance coil and the smoothing capacitor and electromagnetically coupled to the first inductance coil;

(n) a first reverse-blocking diode connected between the second extremity of the first inductance coil and a junction between the first and the second ancillary winding;

(o) a second reverse-blocking diode connected in series with the second inductance coil in a position between the second extremity of the first inductance coil and the smoothing capacitor; and (p) a switch control circuit connected to the primary switch and the ancillary switch for on-off control thereof at a repetition frequency higher than the frequency of the a.c. input voltage, the switch control circuit including means for turning the ancillary switch on earlier than the primary switch is turned on and for turning the ancillary switch off not later than the primary switch is turned off;

(q) whereby the soft-switching of the primary switch is accomplished when the primary switch is turned on.

8. The switching power supply of claim 7 further comprising an ancillary diode connected in series with the ancillary switch for blocking reverse current flow.

9. The switching power supply of claim 7 further comprising an ancillary diode connected in parallel with a serial connection of the second ancillary winding and the ancillary switch and so oriented as to be reverse-biased by a voltage across the smoothing capacitor.

10. The switching power supply of claim 9 further comprising a bypass capacitor connected between the first and the second output of the rectifier circuit, the bypass capacitor being less in capacitance than the smoothing capacitor.

* * * * *

UNITED STATES PATENT AND TRADEMARK OFFICE
CERTIFICATE OF CORRECTION

PATENT NO. : 6,639,813 B2
DATED : October 28, 2003
INVENTOR(S) : Toshiyuki Yamagishi and Koichi Morita It is certified that error appears in the above-identified patent and that said Letters Patent is hereby corrected as shown below:

Column 9,
Line 31, delete "$I_{q1}$" and insert -- $I_{cq1}$ -- therefor;

Column 14,
Lines 28 and 40, delete "$D_1$" and insert -- $D_{11}$ -- therefor;

Column 16,
Line 60, delete "t" and insert -- $t_1$ -- therefor;

Signed and Sealed this

First Day of June, 2004

JON W. DUDAS
*Acting Director of the United States Patent and Trademark Office*